(12) United States Patent
Houjyo et al.

(10) Patent No.: US 10,594,591 B2
(45) Date of Patent: Mar. 17, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Akio Houjyo, Fuji (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 16/033,258

(22) Filed: Jul. 12, 2018

(65) Prior Publication Data

US 2019/0028378 A1 Jan. 24, 2019

(30) Foreign Application Priority Data

Jul. 19, 2017 (JP) .................. 2017-140187

(51) Int. Cl.
*H04L 12/28* (2006.01)
*H04L 12/751* (2013.01)
*H04B 7/14* (2006.01)
*H04W 40/24* (2009.01)

(52) U.S. Cl.
CPC .............. *H04L 45/02* (2013.01); *H04B 7/14* (2013.01); *H04W 40/24* (2013.01)

(58) Field of Classification Search
CPC ....................................................... H04L 12/28
USPC ........................................................ 370/400
See application file for complete search history.

(56) References Cited

U.S. PATENT DOCUMENTS

2009/0274157 A1 11/2009 Vaidya et al.
2018/0330258 A1* 11/2018 Harris .................... G06N 7/005

FOREIGN PATENT DOCUMENTS

JP 2011-516945 5/2011

* cited by examiner

*Primary Examiner* — Dang T Ton
(74) *Attorney, Agent, or Firm* — Fujitsu Patent Center

(57) ABSTRACT

An information processing apparatus is configured to receive a request for communication between a first node and a second node included in a parallel calculation system, acquire job execution information relating a job to be executed by the parallel calculation system, generate connected graph information based on first information on the first node, second information on the second node, the job execution information, and topology information indicating a topology of the plurality of nodes, generate, based on the connected graph information, route information indicating a plurality of routes used when the communication between the first node and the second node is executed, specify, based on the route information, a route having the lowest passing cost among the plurality of routes; and specify a node included in the specified route as a relay node based on positions of the plurality of nodes in the specified route.

9 Claims, 25 Drawing Sheets

FIG. 10

| ROUTE ID | END NODE COORDINATES | NEXT TRANSFER DESTINATION NODE COORDINATES |
|---|---|---|

| VERTEX | ADJACENT NODE |
|---|---|
| 1 | (2, 4) |
| 2 | (1, 3, 5) |
| 3 | (2, 6) |
| 4 | (1, 5, 7) |
| 5 | (2, 4, 6, 8) |
| 6 | (3, 5, 9) |
| 7 | (4, 8) |
| 8 | (5, 7, 9) |
| 9 | (6, 8) |

| VERTEX | ADJACENT NODE |
|---|---|
| 1 | (2, 3, 4, 7) |
| 2 | (1, 3, 5, 8) |
| 3 | (1, 2, 6, 9) |
| 4 | (1, 5, 6, 7) |
| 5 | (2, 4, 6, 8) |
| 6 | (3, 4, 5, 9) |
| 7 | (1, 4, 8, 9) |
| 8 | (2, 5, 7, 9) |
| 9 | (3, 6, 7, 8) |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-140187, filed on Jul. 19, 2017, the entire contents of which are incorporated herein by reference.

FIELD

The embodiments discussed herein are related to an information processing apparatus, a method and a non-transitory computer-readable storage medium.

BACKGROUND

From a viewpoint of performance, it is desirable to reduce as much as possible an overlap between inter-node communication performed by one parallel job and an inter-node communication performed by another parallel job.

Examples of network topologies of a large scale parallel calculation system include a network topology called a mesh or torus. In this system, each communication route of the inter-node communication assigned to a corresponding job is closed to a single sub-mesh or sub-torus so as to avoid interference of communication between the jobs in some cases. However, limiting the node assigned to one job to within the single sub-mesh or the sub-torus is disadvantageous with respect to node assignment efficiency.

In order to increase availability of the node, a plurality of sub-meshes or sub-torus may be used by one job. In this case, interference of communication between jobs occurs.

In the network in which the network topology is the mesh or the torus, a communication route in transfer in which hardware itself designates a start point and an end point of the communication is often determined by a method called dimension-order routing. The dimension-order routing is a kind of static routing, and the route to be used is fixed at a time when the start point and the end point of the communication are specified.

FIG. 23 is a diagram illustrating an example of the dimension-order routing in two dimensions. In FIG. 23, a horizontal direction represents an X axis direction and a vertical direction represents a Y axis direction. A communication packet from a node (A) to a node (B) first proceeds in the X axis direction from coordinates of the node (A), and proceeds in the Y axis direction when an X coordinate becomes equal to a coordinate of the node (B).

In an automatic route selection by hardware, routes other than the route illustrated in FIG. 23 are not used. Therefore, in a system using the dimension-order routing, in a case of reducing interference of communication by using a route different from the route automatically selected by the hardware, software performs the following processes. That is, the software sets a node to be a relay point to nodes other than the start point and the end point of the communication, and explicitly communicates via the node of the relay point. In the following description, the node at the relay point is referred to as a relay node.

FIG. 24 is a diagram illustrating an example of a detour route by relay node setting. The software that performs route determination sets a relay node (C). In addition, the software activates a relay processing function on the relay node (C) or sets up a command sequence for automatic transfer function by hardware on the relay node (C). For example, the automatic transfer function corresponds to InfiniBand CORE-Direct and Tofu session-mode functions.

When communication from the node (A) to the node (B) is performed, the node (A) adds "transfer instruction information to the node (B)" to a header of a communication packet and transmits the communication packet toward the node (C). Accordingly, the communication packet reaches the node (B) by the detour routes (A), (C) and (B).

Generally, in an m-dimensional mesh or torus network, an network address of each node is expressed as a set of m integers such as $(x_1, \ldots, x_m)$, and an upper limit and a lower limit of the integers of each dimension are defined as $a_1 \leq x_1 \leq b_1, a_2 \leq x_2 \leq b_1, \ldots, a_m \leq x_m \leq b_m$.

Here, a size (hop number) of each dimension of the network is $(b_i - a_i + 1) = L_i$ ($i=1, 2, \ldots, m$). A physical network link (hereinafter, simply referred to as "link") exists between two nodes where coordinates of each dimension differ by one. However, in the case of the torus, there is a link between the nodes of coordinates $a_1$ and $b_1$ in the i-th dimension. In the torus, when a difference between the coordinates of the i-th dimension is calculated by $\mod(b_i \times a_i + 1)$, handling of the mesh and torus coordinates may be substantially the same. Japanese National Publication of International Patent Application No. 2011-516945 is an example of the related art.

SUMMARY

According to an aspect of the invention, an information processing apparatus includes a memory, and a processor coupled to the memory and configured to receive, from a first node included in a parallel calculation system including a plurality of nodes, a request for communication between the first node and a second node included in the parallel calculation system, acquire job execution information relating a job to be executed by the parallel calculation system, generate connected graph information based on first information on the first node, second information on the second node, the job execution information, and topology information indicating a topology of the plurality of nodes, generate, based on the connected graph information, route information indicating a plurality of routes used when the communication between the first node and the second node is executed, specify, based on the route information, a route having the lowest passing cost among the plurality of routes; and specify a node included in the specified route as a relay node based on positions of the plurality of nodes in the specified route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of the data structure of route table information;

DESCRIPTION OF EMBODIMENTS

Figure 1:
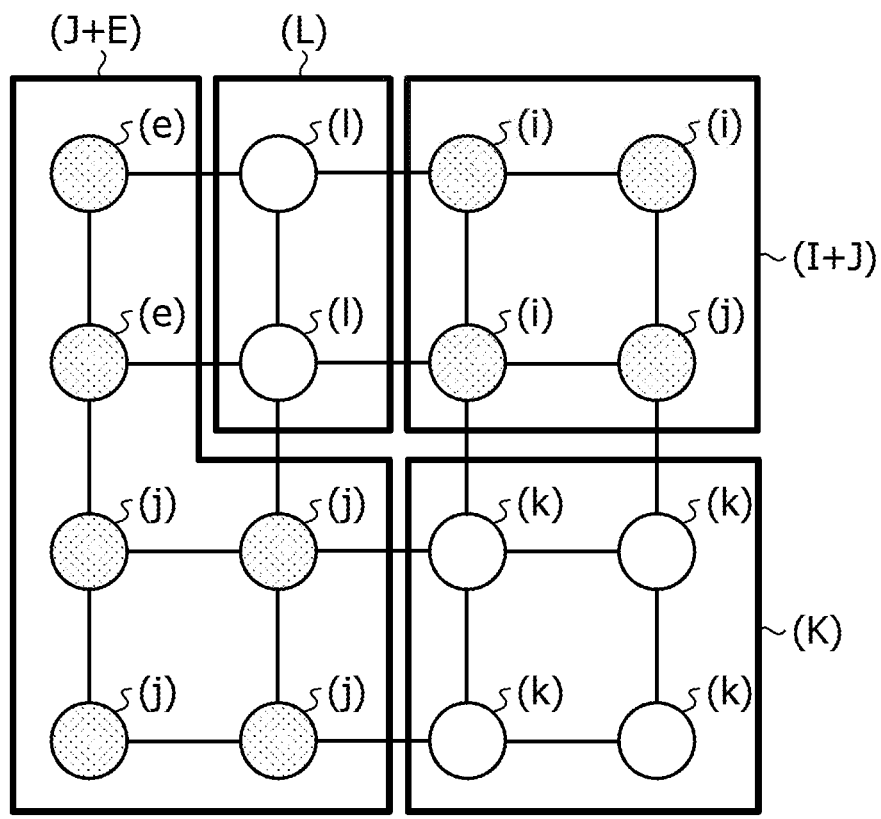
FIG. 1 is a diagram illustrating an example of a process of a relay control node according to a present embodiment.

In the related art described above, there is a problem that it is difficult to determine a relay node that determines an inter-node communication route without taking time while consider the passing cost.

For example, when determining the communication route in assumptions 1 and 2 below, the number of routes depends on a combination relating to a position of the relay node.

Assumption 1: A network in which dimension-order routing is used as a function of hardware.

Assumption 2: Relay nodes are explicitly determined by software and communicate.

In the following description, the communication from the node used by a certain job to the file server node or the communication between the nodes used by the same job is expressed as "communication of an own job".

It is preferable to select the combination of relay nodes so that the communication of the own job does not interfere with other job communication as much as possible.

In principle, it is considered to compare the interference cost of communication in each combination with any criterion for all combinations of empty nodes that are candidates for relay nodes, and select a combination with the minimum interference cost. For example, it is based on "the number of links that overlap with the route used by another job".

In a case of selecting the combination that minimizes the interference cost, a process of selecting the combination with the minimum interference cost by using the term "minimum cost flow problem" in "graph theory" as follows can be expressed simply.

"Graph" having a node of a physical network as "vertex" and a link as "edge" will be referred to as "physical network graph" below. In addition, "physical network graph" is expressed as $\Gamma_p(V, E)$. V is a management structure corresponding to all nodes in the system and is treated as a list. E is a structure corresponding to all the physical links in the network of the system and handled as a combination of all adjacent lists of each vertex.

For example, the software calculates the cost of interfering with the communication of another job using $\Gamma_p(V, E)$ according to Conditions 1 and 2 below.

Condition 1: Whether one end point of the communication route is the node of the own job and the other end point is a file server node, both ends of the communication route are nodes of the own job.

Condition 2: In a case where at least one other job is in use, all passing costs "edge (element of E)" of graph $\Gamma_p(V, E)$ are set to "1". In a case where both ends of the link are the nodes (a), (b), and (c) below, the passing cost of "edge (element of E)" is set to "0".

(a): A node not using any job.

(b): A node that constitutes a sub-mesh of its own job.

(c): A server node for which a job of its own job requests a service (for example, in the case of communication with IO to a certain file server, the sub node is a file server).

Here, in a case of calculating the cost of interfering with the communication of another job using $\Gamma_p(V, E)$ according to Conditions 1 and 2 above, the number of nodes and links increases in a large scale system. Accordingly, the number of combinations of nodes and links rapidly increases, and it is difficult to examine combinations simply from the viewpoint of calculation amount.

For example, in the case of a two-dimensional n×n mesh network (the number of nodes is $n^2$), the adjacency matrix representing the graph of the mesh network is $n^2 \times n^2$ components, the adjacency list is n2×4 elements, a coupling matrix is $n^2 \times ((n+2)(n-1))$ component.

Figure 25:
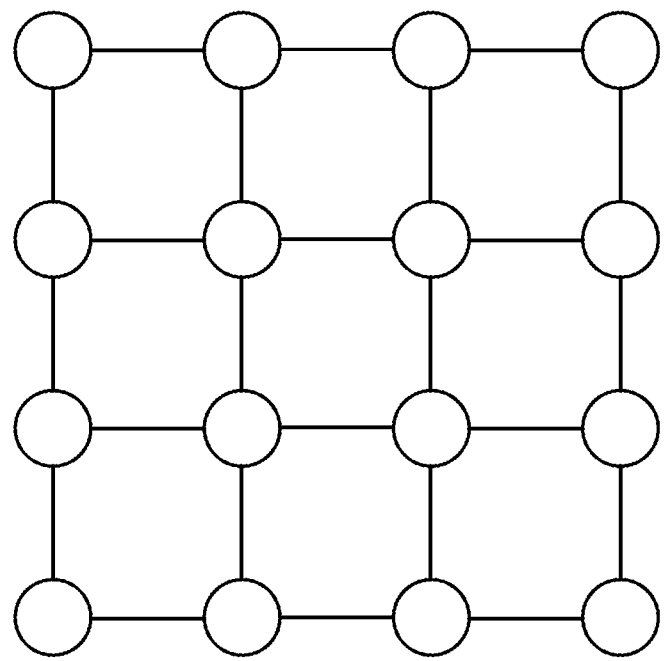
FIG. 25 is a diagram illustrating an example of a mesh network.

FIG. 25 is a diagram illustrating an example of the mesh network. As illustrated in FIG. 25, in a case of 16 nodes, the adjacency matrix is 16×16=256 components, and the coupling matrix is 16×18=288 components. However, in the case of 1000 nodes, the adjacency matrix includes 108 components, and the adjacency matrix includes more components.

That is, in a large-scale system, in a case of calculating the cost of interfering with the communication of another job using the above-described $\Gamma_p(V, E)$, since a calculation time increases, it is difficult to select the relay node that suppresses interference between the jobs in a realistic time.

In the present embodiment, the node of a communication terminal and the "all nodes usable as relay points" are collectively defined as being the same type node of "active node". A node at the communication end point indicates a node at the start of communication and a node at the end point. The job occupying the communication end node is expressed as "own job".

For example, let the following 1a to 3a be "active nodes". The communication closed at the active node is regarded as not interfering with other jobs.

1a: Node not using any job.
2a: Node constituting sub-mesh of own job.
3a: Server node where its own job requests service.

In addition, the following 1b to 3b may be set as "active node".

1b: Node not using any job.
2b: Node constituting the sub-mesh of a job common to its own job and a user.
3 b: Server node where its own job requests service.

A method of defining the active node is not limited to 1a to 3a, 1b to 3b. For example, a node that is in use by a job permitting communication interference may be set as an active node. In the following description, it will be simply described as a plurality of predetermined nodes (groups) including the node of the communication terminal.

Subsequently, an example of the process of the relay control node according to the present embodiment will be described. The relay control node is an example of a parallel processing device. The relay control node obtains a communication route (each relay node included in the communication route that minimized interference between jobs) that minimizes interference between jobs, on the assumption that the detour route is used by setting the dimension-order routing and the relay node.

The relay control node generates a physical network graph corresponding to the physical network in order to obtain a communication route in which interference between jobs is suppressed as much as possible, hierarchizes the minimum cost flow problem for the physical network graph, and obtain a quasi-minimum cost flow. For example, the relay control node executes the following processes 1c and 2c, thereby generating a "interconnected component graph" where a vertex is "the interconnected component of the partial graph including only the vertices of the active node".

1c: Relay control node generates a partial graph $\Gamma_0(V_0, E_0)$ including only vertices of "active node" as vertices in the physical network graph.

2c: Relay control node obtains the "interconnected component" of the partial graph $\Gamma_0(V_0, E_0)$. The set of interconnected components is defined as $V_C = C_1, C_2, \ldots, C_n$. The relay control node generates a set of elements "$S=(C_i, C_j)|C_i, C_j \in V_C, i \neq k$" from all sets of the interconnected component. The relay control node sets $EC=T$, assuming that there is no part of the set S of elements, $T \subset S$, and a "graph in which $e_{ij}=(C_i, C_j)$ is the edge between the vertex Ci and the vertex $C_j$" $\Gamma_c(V_c, E_c)$ is generated. Hereinafter, $\Gamma_c(V_c, E_c)$ is expressed as "interconnected component graph".

In the following description, it is assumed that $C_1$ includes the start node $g_0$ of the communication of the own job and $C_t$ includes the end node $f_t$ of the communication of the own job.

Simple use of the minimum cost flow problem for large scale networks increases calculation amount. Therefore, the relay control node shortens the time to specify the relay node by executing the next processes 1d and 2d having a relatively small calculation amount.

1d: Relay control node obtains a pair of nodes giving the shortest distance between interconnected components.

2d: Relay control node specifies a communication route with a low passing cost based on the interconnected component graph in which the passing cost at the shortest distance between the interconnected components is replaced by the passing cost between interconnected components.

The procedure of synthesizing solutions of the above processes 1d and 2d will be described in the following 1e to 3e, using the terms of the graph theory.

1e: Relay control node sets the passing cost of the edge $e_{ij}=(C_i, C_j)$ as the route of the minimum cost between $C_i$ and $C_j$. The relay control node stores the pair of $C_i$ node and $C_j$ node giving the route of minimum cost as $(f_{ij}, g_{ij})$.

2e: Relay control node obtains the route $(E_1, \ldots, E_k)$ that the passing cost becomes the minimum cost by calculating the solution of the minimum cost flow problem for $\Gamma_c(V_c, E_c)$. $E_1=(C_1, C_2)$, $E_1=(C_2, C_3)$, ..., $K_k=(C_k, C_t)$ by rearranging the code to the interconnected components.

3e: Relay node sets pairs of nodes that determine the passing costs of each edge, $E_1, \ldots, E_p, \ldots, E_k$ of the route giving the minimum cost flow in the interconnected component graph, as $(f_0, g_1, f_1, g_2, \ldots, f_k, g_k, f_t)$ when $E_p=(f_p, g_p)$ is established for $1 \leq p \leq k$.

FIG. 1 is a diagram illustrating an example of a process of the relay control node according to the present embodiment. FIG. 1 illustrates a 4×4 mesh network. In the mesh network of FIG. 1, a node (e) is an empty node. A node (i) is an IO node. A node (j) is a node of a job to communicate with the IO node. A node (l) and a node (k) are nodes of a different job from the node (j). A node (e), a node (i), and a node (j) are active nodes.

In the example illustrated in FIG. 1, there are four interconnected components (J+E), (I+J), (K), and (L). In a case of selecting the communication route of the job of the node (j), the relay control node first generates an "interconnected component graph" having only the interconnected component of the node (j) as a vertex.

Figure 2:
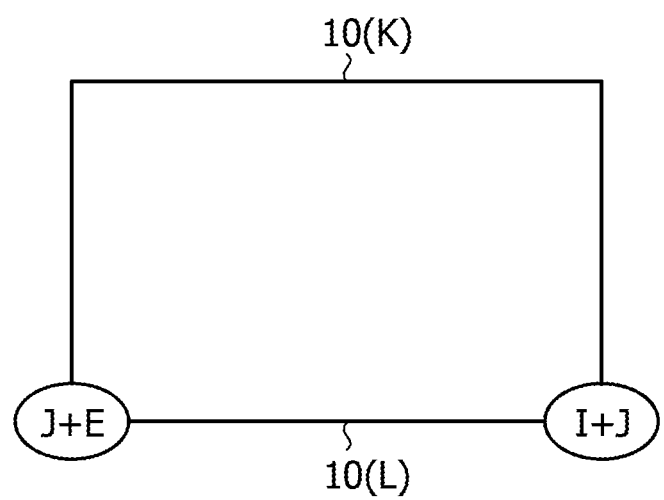
FIG. 2 is a diagram illustrating an example of an inter-connected component graph.

FIG. 2 is a diagram illustrating an example of the interconnected component graph. The interconnected component graph illustrated in FIG. 1 has a vertex (J+E) and a vertex (I+J). The vertex (J+E) corresponds to the interconnected component (J+E) in FIG. 1. The vertex (I+J) corresponds to the interconnected component (I+J) in FIG. 1. The vertex (J+E) is coupled to the vertex (I+J) via a route 10(K) and a route 10(L). The route 10(K) is the route passing through the interconnected component (K) of FIG. 1. The route 10(L) is the route passing through the interconnected component (L) of FIG. 1.

The relay control node determines the route with the minimum passing cost for the interconnected component graph illustrated in FIG. 2. For example, in a case where a vertex including a start node is a vertex (J+E) and a vertex including a start node is a vertex (J+I), a route with the lowest passing cost is at least one of the route 10(K) and the route 10(L). That is, since the comparison target of the passing cost is reduced, it is possible to suppress the calculation amount.

For example, if the passing cost of the route 10 (L) is less than the passing cost of the route 10(K), the relay control node specifies the communication route as a communication route via the route 10(L). For example, a relay device specifies the end node included in each interconnected component of the communication route as a relay node. In a case where there is a plurality of end nodes included in the interconnected component, a node to be selected as the relay node may be set in advance.

Generally, in a large-scale parallel system, since "a job that uses a large number of nodes at the same time" that is executed only in the large-scale system is executed, the number of vertices of the "interconnected component graph" is small compared with the graph corresponding to an original physical network. For example, in a system in which an average job uses 100 nodes at the same time, the route with the low passing cost may be calculated on a graph with a number of vertices of $\frac{1}{100}$.

The process of specifying a communication route with a low passing cost using the interconnected component graph involves a process of obtaining an interconnected component and a process of pulling back (described later). However, the order is smaller than the calculation amount of the process for obtaining the communication route of the communication cost on the original graph.

Therefore, according to the relay control node of the present embodiment, it is possible to efficiently execute detour communication using a communication route with small interference with other jobs in a realistic calculation time even in the large-scale system.

Figure 3:
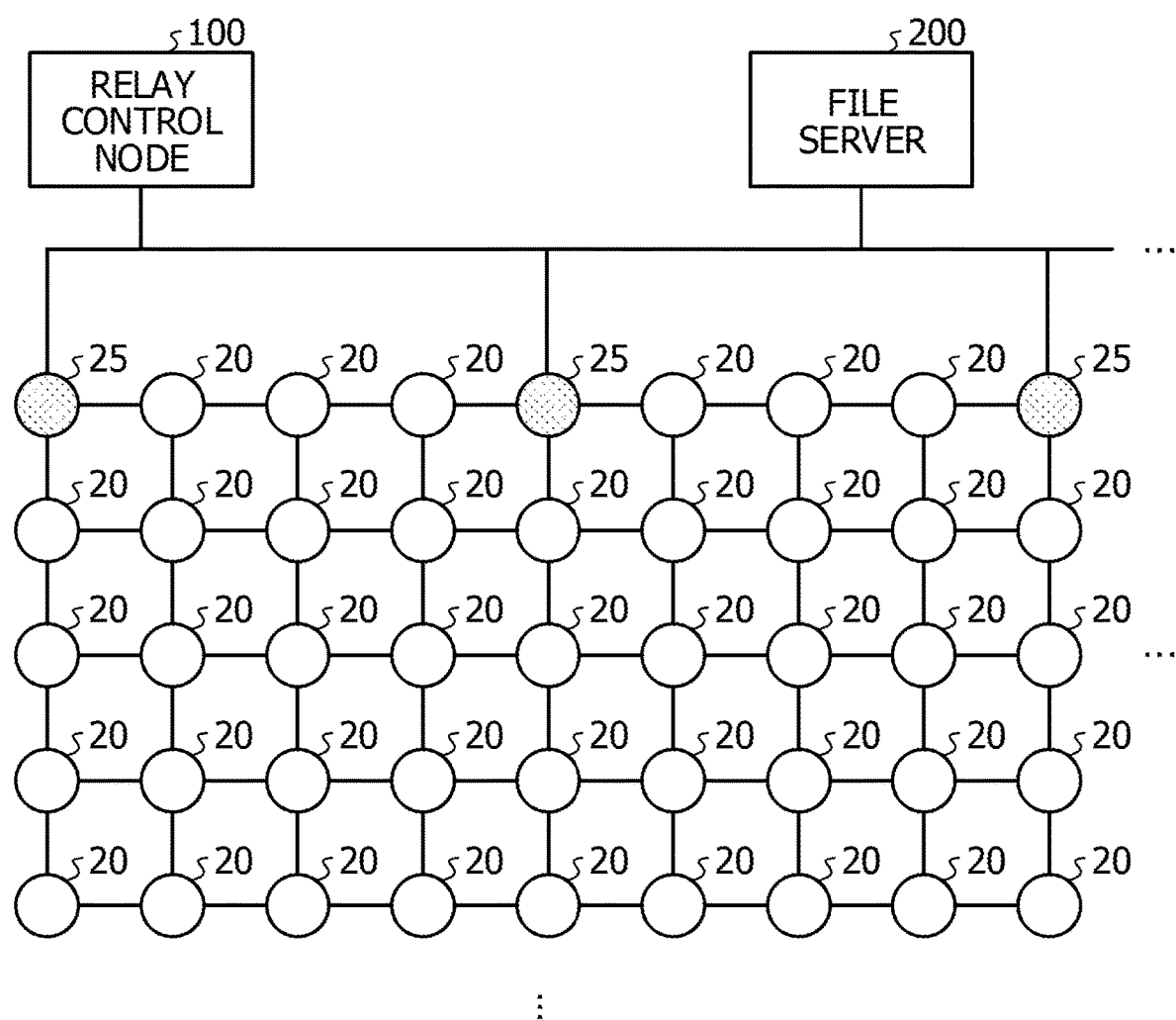
FIG. 3 is a functional block diagram illustrating a configuration of a system according to the present embodiment.

Subsequently, the configuration of the system having the relay control node will be described. FIG. 3 is a functional block diagram illustrating a configuration of the system according to the present embodiment. As illustrated in FIG. 3, this system includes a plurality of nodes 20, a plurality of IO nodes 25, a relay control node 100, and a file server 200. Although not illustrated, this system may include other nodes and IO nodes.

In a large-scale parallel calculator, a file server 200 that supports a distributed file system is installed rather than directly coupling a large-capacity two-dimensional storage device to the node 20 that performs the calculation. The node 20 performs an iO process between the file servers 200 via the IO node 25.

In the system illustrated in FIG. 3, in order to avoid the communication from being temporarily concentrated on the file server 200 from a large number of nodes 20 to avoid a CPU load, memory usage, or communication bandwidth bottleneck, the entire set of the nodes 20 is divided into several subsets. The IO node 25 corresponding to a small-scale file server "close on the network" responsible for process called "staging" is set for nodes in each subset.

Here, "closer on the network" indicates, for example, a configuration in which it is coupled to a network called "interconnect" used for communication between the nodes 20, having a large communication bandwidth and a small communication latency.

In the following description, the node 20 or the IO node 25 as the starting point of communication is referred to as a start node. The node 20 or the IO node 25 as the end point of communication is referred to as an end node. The node 20 or the IO node 25 as a relay point of the communication is referred to as a relay node.

Subsequently, the configuration of software operating in the system illustrated in FIG. 3 will be described. For example, the present invention is realized as a combination of a communication library function in a parallel system and an execution management unit of a communication library function. The "communication library function" is linked to an application communicating with a process on another node and operates in the execution context within a memory space of the application.

The execution management unit of the communication library function may operate in the memory space independent of the application to which the communication library is linked. In addition, the execution management unit of the communication library function includes a portion that operates on a node different from the node on which the application operates.

For example, "the execution management unit of the communication library function" includes "a portion that manages the message transmission route" and "a portion that performs relay control of each message". The memory space in which "the portion that manages the message transmission route" and "the portion that performs the relay control of each message" operate is different from the operating nodes in general.

Figure 4:
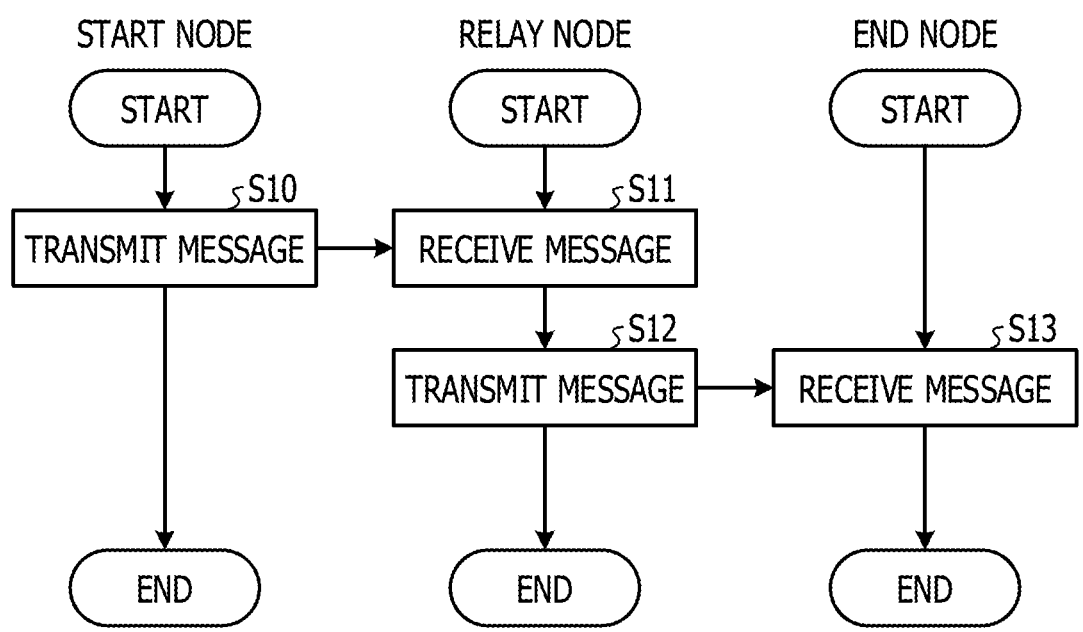
FIG. 4 is a diagram illustrating relaying of communication on which the present invention is based.

Subsequently, the relaying of the communication on which the present invention is based will be described. FIG. 4 is a diagram illustrating the relaying of the communication on which the present invention is based. As illustrated in FIG. 4, the start node transmits a message to the relay node (step S10). The relay node receives a message from the start node (step S11). The relay node transmits the message to the end node (step S12). The end node receives the message from the relay node (step S13).

Here, the message reception by the communication hardware of the node is to store the data transferred from the other node via the network at a predetermined memory address. The message transmission by the communication hardware of a node is to transfer data stored at a predetermined memory address to another node via the network. A relay process at the relay node is realized by the message transmission to the data stored at a predetermined address by message reception.

Figure 5:
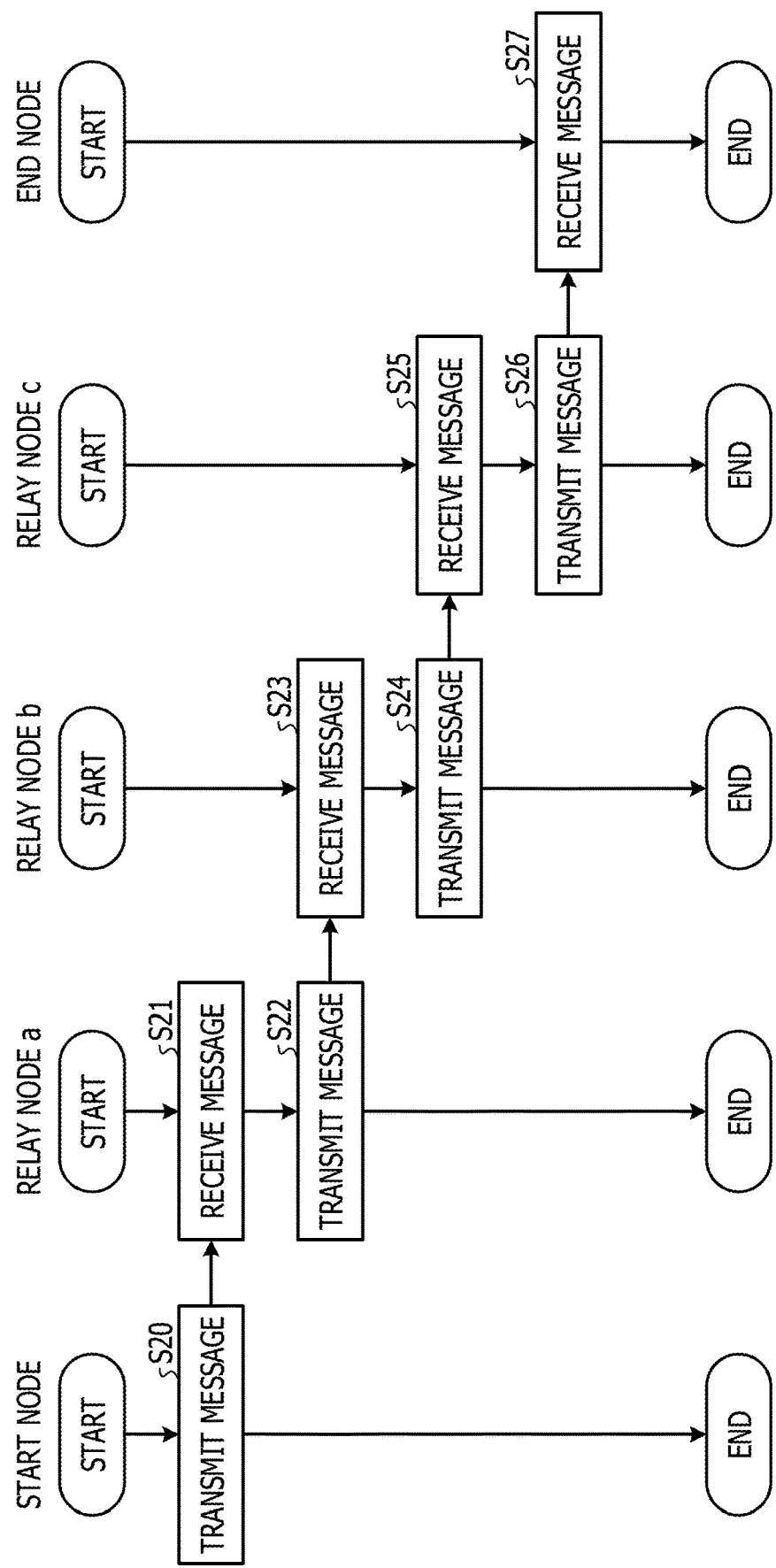
FIG. 5 is a diagram illustrating the relaying of the communication when a plurality of relay nodes is set.

A plurality of relay nodes can be set, and the processing procedure in a case where a plurality of relay nodes is set is as illustrated in FIG. 5. FIG. 5 is a diagram illustrating the relaying of the communication in a case where a plurality of relay nodes is set.

As illustrated in FIG. 5, the start node transmits a message to the relay node (step S20). A relay node a receives a message from the start node (step S21). The relay node a transmits the message to a relay node b (step S22).

The relay node b receives a message from the relay node a (step S23).

The relay node b transmits the message to a relay node c (step S24). The relay node c receives the message from the relay node b (step S25). The relay node c transmits the message to the end node (step S26). The end node receives the message from the relay node c (step S27).

In general, relay control methods on the relay nodes are roughly classified into Method 1f and Method 2f.

Method 1f: The node of the job, which is the subject of inter-node communication, stores all instructions of the transfer route in a message header. The instruction of the transfer route includes the address of the relay node via which the message passes. The method 1f is called source routing. In the method 1f, it is desired to select the relay node at the transmission source or informed of the relay node to be used before transmission.

Method 2f: Set "routing table (routing table)" for each relay node. The routing table is a table that defines the next forwarding destination of the received message.

In this embodiment, as an example, the relay control node 100 notifies the relay node of the information of the routing table prior to starting of the communication in accordance with the method 2f. However, in the present invention, in the method 1f, it is also applicable when the relay control is performed.

Next, a process in which the relay node relays each message will be described. The process by which a relay node relays a message roughly includes the following methods 1g and 2g.

Method 1g: After the relay software of the relay node receives the message, the relay software transmits the received message to the next transfer destination.

Method 2g: The relay node sets an automatic transfer destination for each content of the message to the hardware having the automatic message transfer function of the received message.

For example, InfiniBand and Tofu are available as the hardware having an automatic message transfer function of received messages. The automatic forwarding function of Tofu's message is called CORE-Direct.

In the present embodiment, the relay process on the relay node is executed by a relay control agent which is software. The relay node may execute the relay process using the hardware having the automatic transfer function.

The interface between two components operating on different nodes 20 is the sending and receiving of messages. For example, in the case where the interface between two components operating on the same node 10 is operating in the same virtual space, the function call is an interface, and at that time, there are many cases where copying of memory contents is not performed by notifying the memory address at which predetermined data is stored.

The message communications between the nodes 20 are roughly classified into a communication executed between the operation units on different nodes 20 of the same application and a communication executed between the distributed file system on the IO server and the application on the node 20. In addition, the following definitions 1h and 2h are performed.

Definition 1h: In a case of communicating between different programs, the node 20 acquires a common application ID among the programs.

Definition 2h: In a case of communicating with the distributed file system on the IO server, the node 20 assigns a specific numerical value as the application ID. For example, a specific number is set to 0.

The relay control node 100 gives a route ID to a route setup request in the physical network and adds an entry of a route configuration management table.

Next, an example of a data structure of a message used for message transmission and reception between components such as the node 20 will be described.

Figure 6:
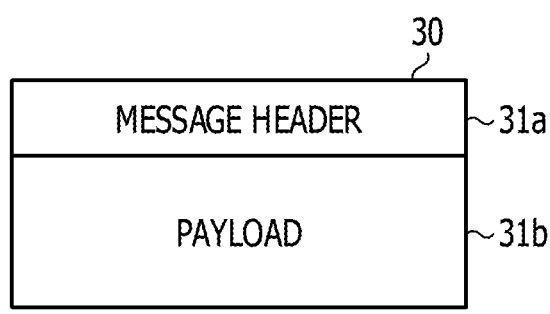
FIG. 6 is a diagram illustrating an example of a data structure of a message set and referred to by a relay control agent of a node.

FIG. 6 is a diagram illustrating an example of a data structure of a message set and referred by a relay control agent of a node. As illustrated in FIG. 6, the message 30 set and referred to by the relay control agent of the node 20 includes a message header 31a and a payload 31b.

Figure 7:
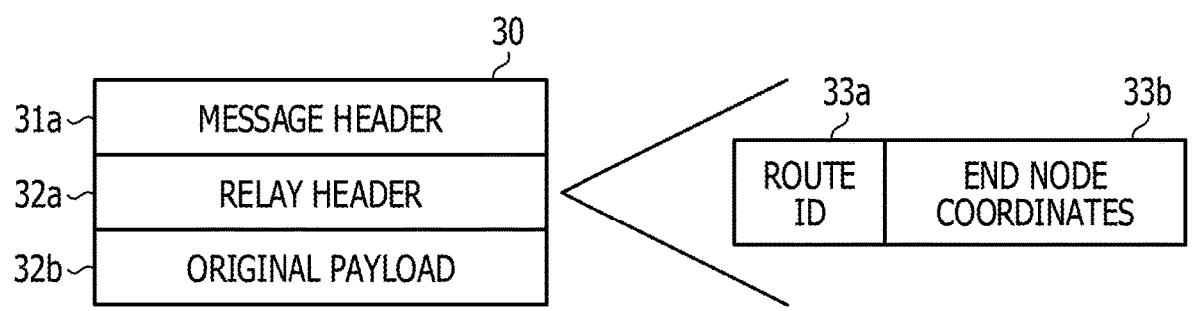
FIG. 7 is a diagram illustrating an example of the data structure of a message for communication hardware of the node.

FIG. 7 is a diagram illustrating an example of the data structure of a message for communication hardware of the node. As illustrated in FIG. 7, the message 30 for the communication hardware of the node 20 includes the message header 31a, a relay header 32a, and an original payload 32b. The relay header 32a includes a route ID 33a and end node coordinates 33b. Among them, the route ID 33a stores information uniquely indicating the communication route. The end node coordinates 33b store information indicating the position of the end node.

Figure 8:
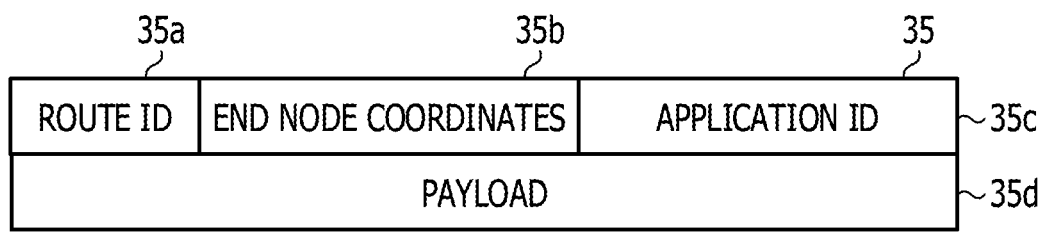
FIG. 8 is a diagram illustrating an example of the data structure of a message used for communication between the relay control agent of a start node and an application.

FIG. 8 is a diagram illustrating an example of the data structure of a message used for communication between the relay control agent of a start node and an application. As illustrated in FIG. 8, this message 35 includes a route ID 35a, end node coordinates 35b, an application ID 35c, and a payload 35d. Among them, the route ID 35a stores information uniquely indicating the communication route. The end node coordinates 35b store the information indicating the position of the end node. The application ID 35c stores information uniquely identifying the application. The payload 35d stores various kinds of user data items.

Figure 9:
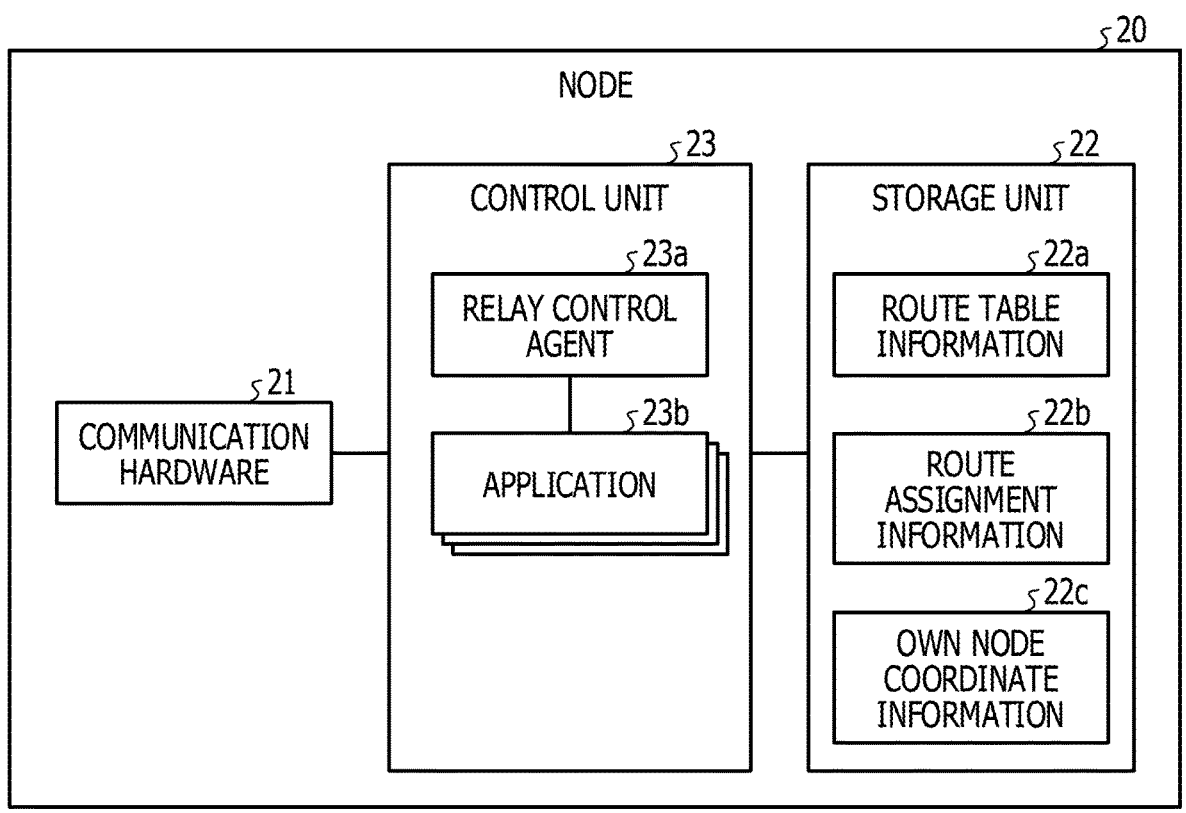
FIG. 9 is a functional block diagram illustrating a configuration of the node according to the present embodiment.

FIG. 9 is a functional block diagram illustrating a configuration of the node according to the present embodiment. As illustrated in FIG. 9, this node 20 includes communication hardware 21, a storage unit 22, and a control unit 23. The communication hardware transmits a message to the node 20 to be a transfer source of the message.

The storage unit 22 includes route table information 22a, route assignment information 22b, and own node coordinate information 22c. The storage unit 22 corresponds to a semiconductor memory device such as a random access memory (RAM), a read only memory (ROM), or a flash memory, or a storage device such as a hard disk drive (HDD).

FIG. 10 is a diagram illustrating an example of the data structure of route table information. As illustrated in FIG. 10, the routing table information 22a associates a route ID, end node coordinates, and next destination node coordinates. The route ID stores information uniquely indicating the communication route. The end node coordinates store information indicating the position (coordinates) of the end node on the physical network. The next transfer destination node coordinates store the information of the coordinates of the adjacent node which is the transfer source in the case of transmitting a packet to the end node of the corresponding route ID and end node coordinates.

The routing table information 22a is notified from the relay control node 100 as a response to the route setting request.

Figure 11:
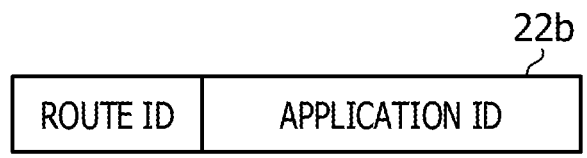
FIG. 11 is a diagram illustrating an example of a data structure of route assignment information.

FIG. 11 is a diagram illustrating an example of a data structure of route assignment information. As illustrated in FIG. 11, this route assignment information 22b associates the route ID with the application ID. The route ID stores information uniquely indicating the communication route. The application ID is information uniquely indicating the application. For example, even in the same node 20, a plurality of applications may operate, and different communication routes may be allocated to each application.

The own node coordinate information 22c is information on the coordinates of the own node 20 itself.

The control unit 23 includes a relay control agent 23a and an application 23b. The control unit 23 can be realized by a central processing unit (CPU), a micro processing unit (MPU), or the like. In addition, the control unit 23 can also be realized by hard-wired logic such as an application specific integrated circuit (ASIC) or a field programmable gate array (FPGA).

The relay control agent 23a is a processing unit that executes a relay process of the message. For example, the relay control agent 23a receives the message, and executes a relay end process in a case where the received message is a message addressed to the own node 20. In a case where the received message is not a message addressed to its own node 20, the relay control agent 23a transmits the message to the node of the next transfer destination.

Figure 12:
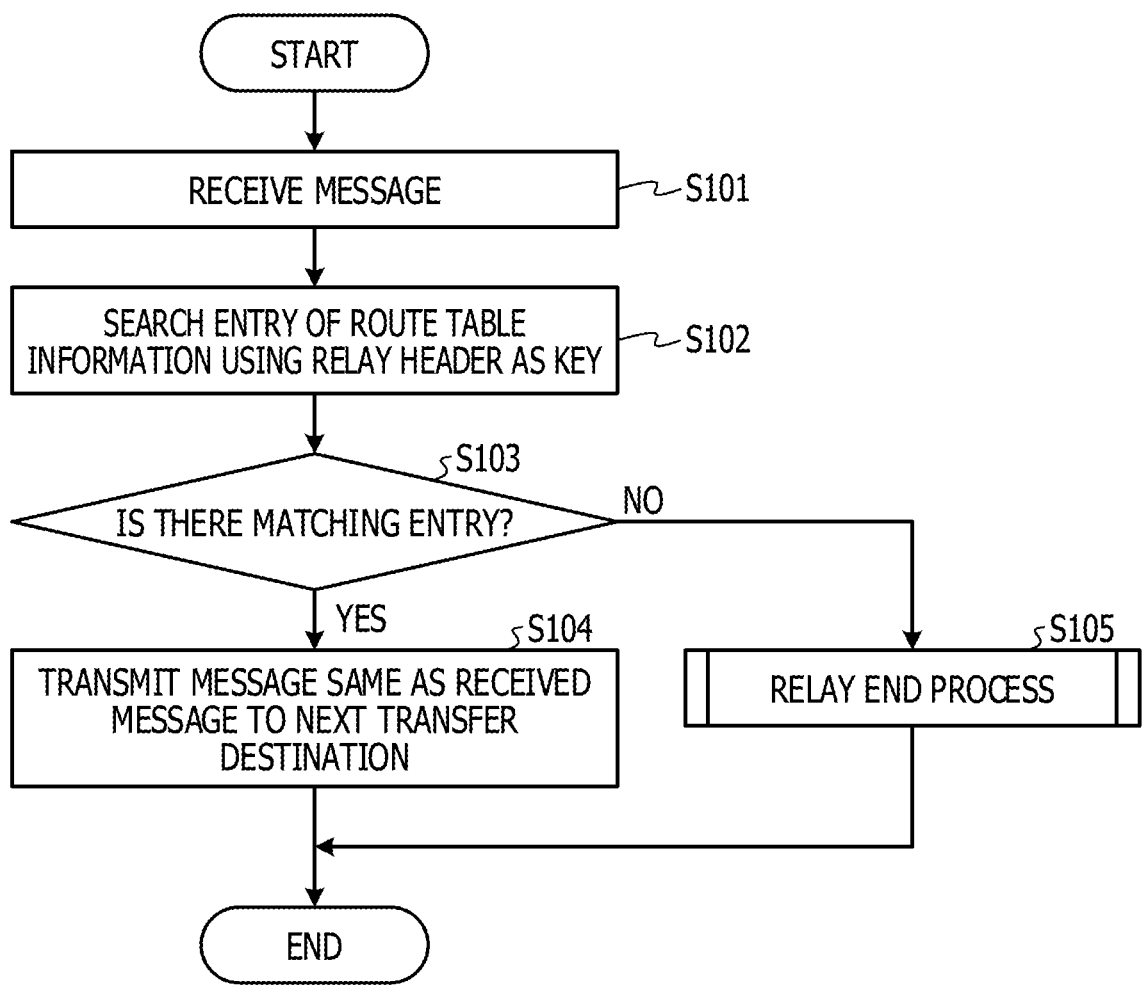
FIG. 12 is a flowchart illustrating a relay process executed by the relay control agent.

FIG. 12 is a flowchart illustrating a relay process executed by the relay control agent. As illustrated in FIG. 12, the relay control agent 23a of the node 20 receives the message (step S101). The relay control agent 23a searches the entry of the routing table information 22a with the relay header of the message as a key (step S102).

The relay control agent 23a determines whether there is a matching entry (step S103). In a case where there is a matching entry (step S103, Yes), the relay control agent 23a transmits the same message as the received message to the next transfer destination (step S104).

In a case where there is no matching entry (step S103, No), the relay control agent 23a executes the relay end process (step S105).

Figure 13:
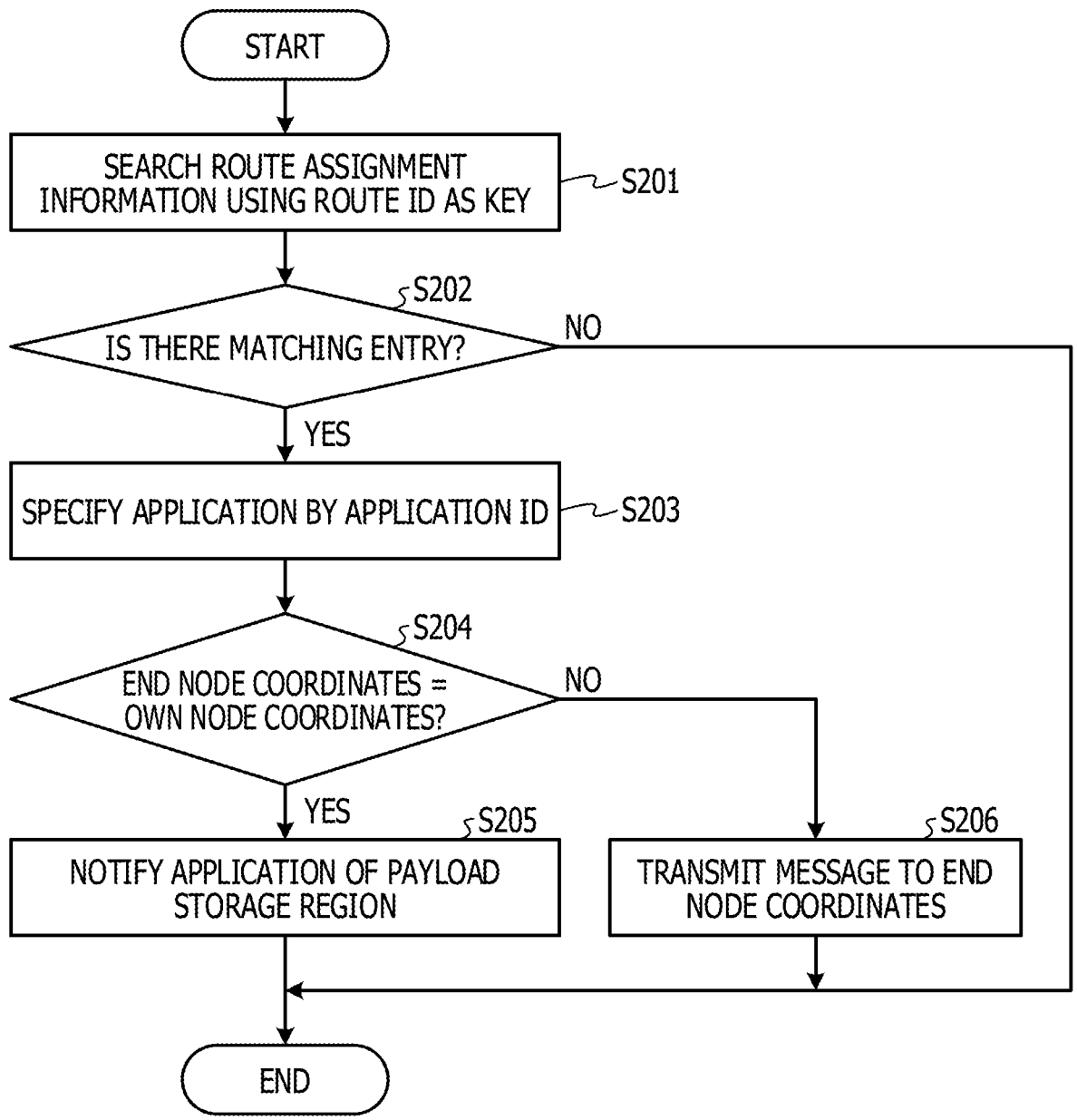
FIG. 13 is a flowchart illustrating a relay end process.

The relay end process illustrated in step S105 of FIG. 12 will be described. FIG. 13 is a flowchart illustrating a relay end process. As illustrated in FIG. 13, the relay control agent 23a searches the route assignment information 22b by using the route ID as a key (step S201). When there is no matching entry (step S202, No), the relay control agent 23a ends the process. In a case where there is a matching entry (step S202, Yes), the relay control agent 23a proceeds to step S203.

The relay control agent 23a specifies the application with the application ID of the matching entry (step S203). The relay control agent 23a determines whether the end node coordinates stored in the message are equal to the own node coordinates (step S204).

In a case where the end node coordinates stored in the message are equal to the own node coordinates (step S204, Yes), the relay control agent 23a notifies the application 23b of the payload storage area (step S205).

On the other hand, in a case where the end node coordinates stored in the message and the own node coordinates are not equal (step S204, No), the relay control agent 23a transmits a message to the end node coordinates (step S206).

The application 23b corresponds, for example, to the distributed file system. The application 23b includes a plurality of applications. In the following description, one application among a plurality of applications included in the application 23b is simply referred to as an application as appropriate.

The application is a processing unit that transmits and receives a message to and from an application of a start node or an end node forming a pair via the communication hardware 21 and the relay control agent 23a. For example, the application receives the notification of the payload storage area from the relay control agent 23a and acquires the data.

In addition, the application transmits a route setting request to the relay control node 100 when transmitting a message to the end node. Accordingly, the routing table information 22a is received from the relay control node 100 as a response to the route setting request. Further, in a case where the application makes a route setting request, an entry in which the route ID and the application ID are associated with each other is stored in the route assignment information 22b.

Subsequently, the process relating to the relay control node 100 illustrated in FIG. 3 is performed. In the following embodiments, the management of the message transmission route is performed by the relay control manager, which is software operating on the relay control node 100. The relay control of each message is performed by the relay control agent 23a which is the software of each node 20.

One relay control node 100 is installed at least in the entire system. The process of the relay control node 100 may be executed by a plurality of nodes 20 instead. For example, the determination of the relay node at the time of communication with the IO node 25 may be performed by the independent relay control manager for each IO node 25. In this case, the number of relay control nodes 100 coincides with the number of IO nodes 25.

In the present embodiment, in the communication between a set S of the nodes 20 used by one job J and the one IO node I (the IO node 20 used by job I), a process in a case where the relay control manager specifies a communication route that minimizes interference with inter-process communication in another job. However, the interference cost between communication between the job J and the IO node I and the inter-process communication in other jobs may be the number of commonly used links.

Figure 14:
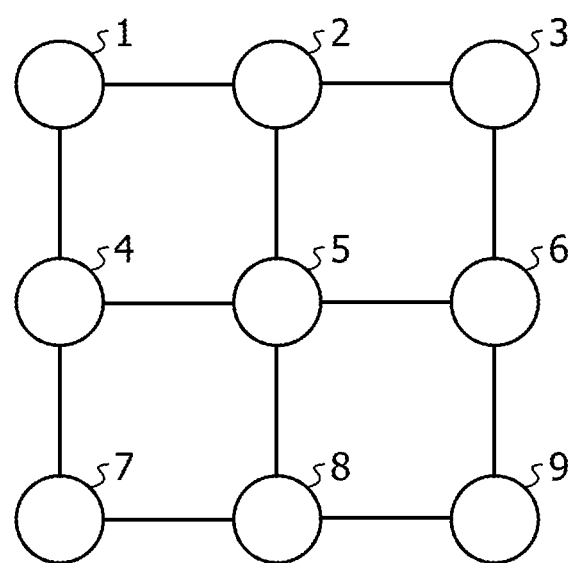
FIG. 14 is a diagram illustrating an adjacency list in a case where a topology of a physical network is a mesh.
Figure 15:
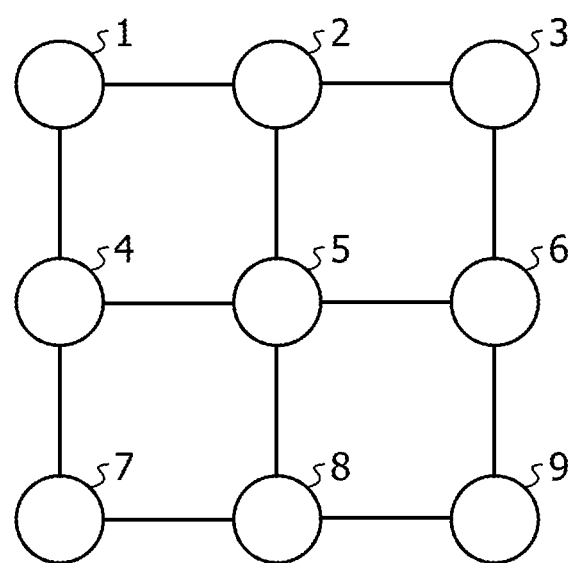
FIG. 15 is a diagram illustrating an adjacency list in a case where the topology of the physical network is a torus.

The physical network graph $\Gamma_p$ having a link in the physical network as an edge and node 20 as a vertex is represented by an adjacent list as illustrated in FIGS. 14 and 15.

FIG. 14 is a diagram illustrating an adjacency list in a case where a topology of a physical network is a mesh. As illustrated in FIG. 14, for example, the adjacent list in a case where a topology of the physical network is a mesh becomes the adjacent list 40a. For example, the adjacent node of node "1" at the vertex becomes node "2, 4".

FIG. 15 is a diagram illustrating an adjacency list in a case where the topology of the physical network is a torus. As illustrated in FIG. 15, for example, the adjacent list in a case where the topology of the physical network is a torus, the adjacent list becomes an adjacent list 40 b. For example, the adjacent node of node "1" at the vertex becomes node "2, 3, 4, 7".

In the present embodiment, since the topology of the physical network is the mesh or the torus, if the physical network graph $\Gamma_p$ is represented by the adjacent list, the data amount becomes relatively small. For example, if the physical network corresponding to the physical network graph $\Gamma_p$ is an N-th order torus, the adjacent list of each vertex has 2N vertices as elements.

The relay control node 100 according to the present embodiment divides the process for obtaining a route minimizing the communication interference with another job in the physical network graph $\Gamma_p$ by dividing into the following two processes 1i and 2i.

Process 1i: To obtain the route with the lowest passing cost in the interconnected component graph $\Gamma_c$ with each interconnected component obtained by grouping the interconnected active nodes as the vertex.

Process 2i: To obtain a route with the lowest passing cost in the graph $\Gamma_1$ with each node 20 included in the interconnected component of the route obtained in process 1i as the vertex.

Here, the route in each interconnected component in the graph $\Gamma_1$ does not interfere with the communication of the route in another job. The calculation time can be suppressed by replacing the minimization of the interference with the communication with another job by a graph smaller than the physical network graph $\Gamma_p$, which is the interconnected component graph $\Gamma_c$.

Figure 16:
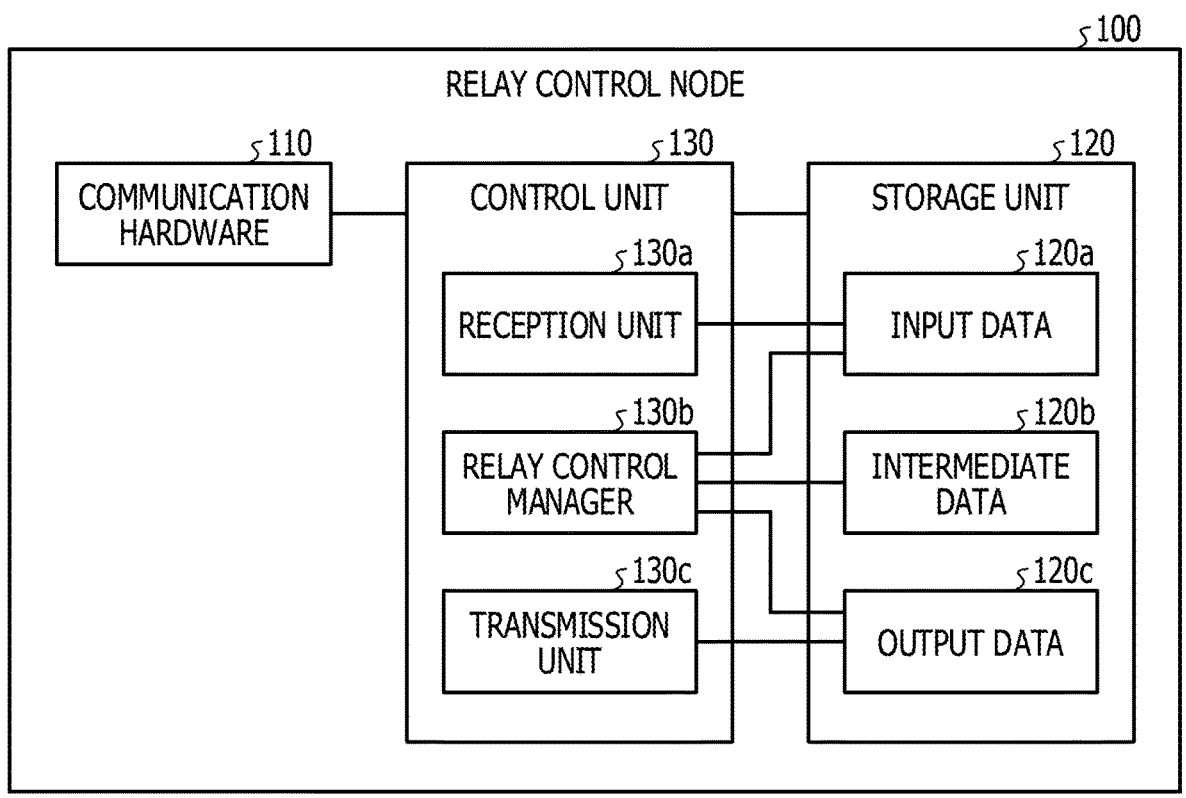
FIG. 16 is a functional block diagram illustrating a configuration of a relay control node according to the present embodiment.

FIG. 16 is a functional block diagram illustrating a configuration of a relay control node according to the present embodiment. As illustrated in FIG. 16, the relay control node 100 includes communication hardware 110, a storage unit 120, and a control unit 130.

The communication hardware 110 is a communication device that executes data communication with the node 20, the IO node 25, and the file server 200. For example, the communication hardware 110 receives a route setting request from the request start node 20 and outputs the request to the control unit 130. For example, the route setting request message includes a communication parameter to be described later. In addition, the communication hardware 110 transmits a response message to the route setting request message output from the control unit 130 to the requesting node 20. For example, the response message includes output data 120c to be described later.

The storage unit 120 includes input data 120a, intermediate data 120b, and the output data 120c. The storage unit 120 corresponds to a semiconductor memory device such as a RAM, a ROM, or a flash memory, or a storage device such as an HDD.

For example, the input data 120a includes "physical network graph $\Gamma_p(V, E)$", "attribute list of all jobs", and "communication parameter".

"Physical network graph $\Gamma_p(V, E)$" is information obtained by graphically representing the topology of the physical network illustrated in FIG. 3 with a cooperation list. The vertex V of the physical network graph $\Gamma_p(V, E)$ is a list of all the nodes in the network. An edge E of the physical network graph $\Gamma_p(V, E)$ is a structure corresponding to all the physical links in the network of the system and is treated as a combination of all adjacent lists of each vertex V.

In addition, in each node, node attribute data is set. The node attribute data includes a node ID, network coordinates of the node, an adjacent list for each node, a usage status of the node, and a job ID.

The node ID is information for uniquely identifying the node 20 (or IO node 25, the same hereinafter). The network coordinates of the node indicate the coordinates $(x_1, x_2, \ldots, x_3)$ of the node 20 on the physical network. The adjacent list for each node is a list of pointers to the node management structure coupled to the physical link of the node. The usage status of the node is information for identifying whether the node is the node 20 (calculation node) or the IO node 25. The job ID is information for uniquely identifying the job occupying the node 20. For example, an invalid value "0" is set as an ID for a job ID corresponding to an empty node or an IO node.

The "attribute list of all jobs" includes a job ID, a job status, a user ID, a list of sub-mesh areas of the node group occupied by the job, an execution start time (or an execution start scheduled time), a scheduled end time, and an active node information. The attribute list of all the jobs is passed from the job scheduler at any time according to the change in the allocation state (the reception unit 130a receives the attribute list of all jobs from a job scheduler). For example, the job scheduler may operate on the relay control node 100 or may operate on a job management device (not illustrated). The job scheduler is an example of a job management unit.

The job ID is information for uniquely identifying the job. The job status is information indicating whether the job stands by being executed, being executed, or being swapped out. The user ID is information for uniquely identifying the user who executes the job.

The list of the sub-mesh areas of the node group occupied by the job is the minimum value $(s_1, s_2, \ldots, s_m)$ and the maximum value $(t_1, t_2, \ldots, t_m)$ in each dimension of the network coordinates.

The execution start time indicates the time at which the job starts the process. The scheduled execution end time indicates the time at which the job ends processing.

The active node information includes a list of all empty nodes, a list of all IO nodes, all lists permitting communication interference, and a list of all nodes used by jobs permitting communication interference.

The "communication parameter" is information included in a route setting request message of the communicating job. For example, the communication parameter includes a job ID of the communicating job, a node ID of a communication start node, a node ID of a communication end node, and a range designation of an active node.

In the range designation of the active node, designating whether the node operating at the same job is set as the active node and designating whether the node operating at the job of the same user ID is set as the active node are included. In addition, the range designation of the active node includes information designating the job that allows interference. Even in a case where the node 20 operating with a job allowing interference is different from the jobs of the start node and the end node, the node 20 becomes an active node.

Returning to the description of FIG. 16. The intermediate data is information generated by a relay control manager 130b, which will be described later. The intermediate data 120b includes a list of all the active nodes, an active node partial graph, an interconnected component list of the active node partial graph, a list of interconnected component pairs of the active node partial graph, and information of the interconnected component list. In addition, the intermediate data 120b includes the shortest route between the interconnected components of the active node partial graph, the communication cost of each edge of the interconnected component graph, and the information of the route giving the minimum cost flow in the interconnected component graph.

The output data 120c includes a relay node list, accompanying information unique to each communication end node, and accompanying information unique to each relay node. For example, the relay node list includes the node ID of each relay node and the network coordinates of each relay node included in the route having the lowest passing cost.

The control unit 130 includes the reception unit 130a, the relay control manager 130b, and a transmission unit 130c. The control unit 130 can be realized by a CPU, an MPU, or the like. In addition, the control unit 130 can also be realized by hard-wired logic such as ASIC and FPGA.

The reception unit 130a receives various kinds of information included in the input data 120a via the communication hardware 110. The reception unit 130a stores the received information in the input data 120a.

The relay control manager 130b is a processing unit that generates the output data 120c finally while generating the intermediate data 120b for calculating the route with the minimum passing cost based on the input data 120a. The relay control manager 130b is an example of a relay control unit.

Based on the output data generated by the relay control manager 130b, the transmission unit 130c generates a response message to the route setting request message. The transmission unit 130c transmits a response message to the start node 20 via the communication hardware 110.

Figure 17:
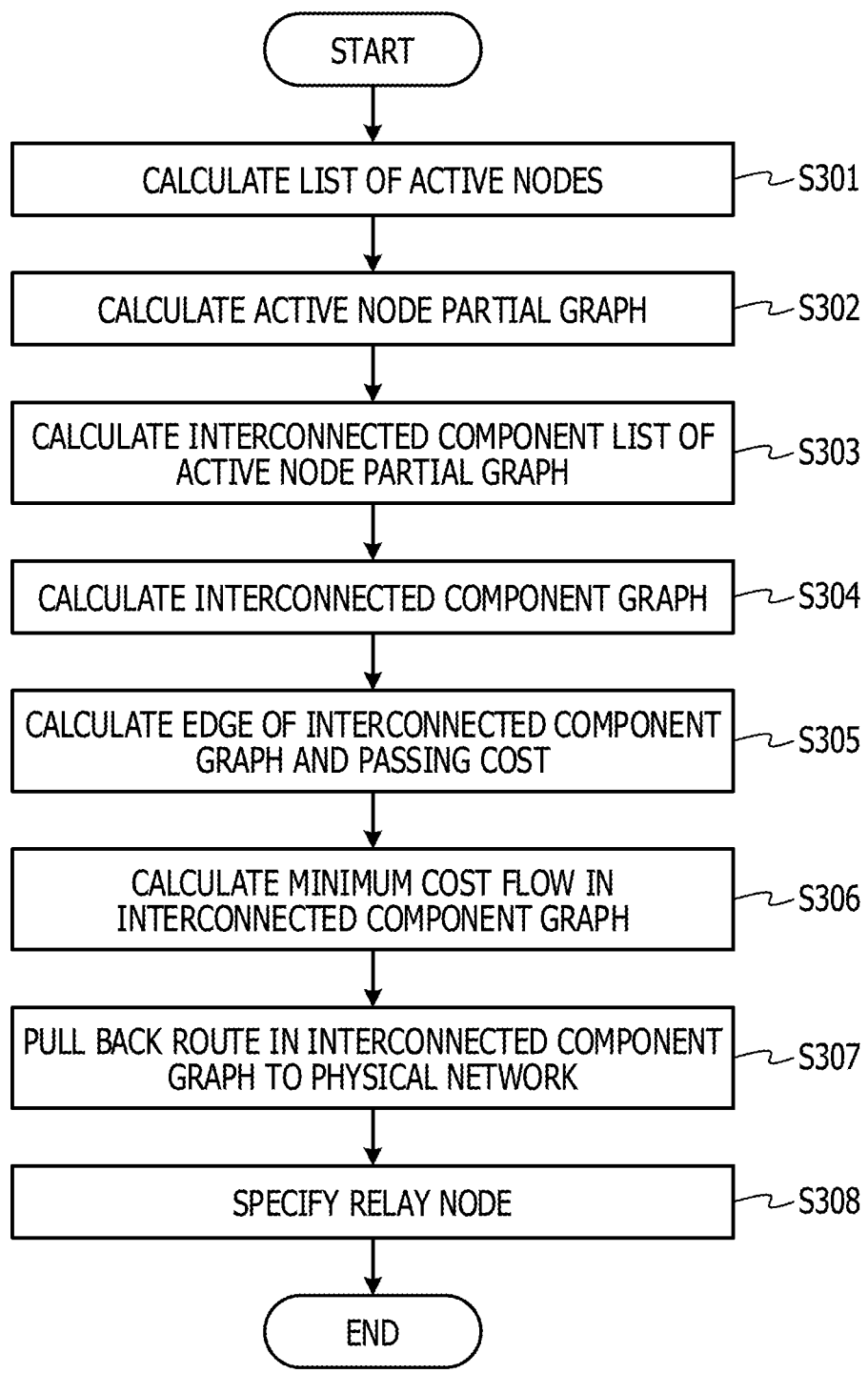
FIG. 17 is a flowchart illustrating a processing procedure in which a relay control manager specifies the relay node.

Next, an example of the processing procedure of the relay control manager 130b will be described. FIG. 17 is a flowchart illustrating a processing procedure in which a relay control manager specifies the relay node. As illustrated in FIG. 17, the relay control manager 130b calculates a list of active nodes (step S301). The relay control manager 130b calculates the active node partial graph (step S302).

The relay control manager 130b calculates an interconnected component list of the active node partial graph (step S303). The relay control manager 130b calculates the interconnected component graph (step S304).

The relay control manager 130b calculates the edge of the interconnected component graph and the passing cost (step S305). The relay control manager 130b calculates the minimum cost flow in the interconnected component graph (step S306). The relay control manager 130b pulls back the route in the interconnected component graph to the physical network (step S307), and specifies the relay node (step S308).

The process of calculating the list of active nodes illustrated in step S301 in FIG. 17 will be described. The relay control manager 130b acquires communication parameters and active node information from the input data 120a. The relay control manager 130b calculates a list of active nodes by merging lists of various nodes included in the active node information according to the designation of communication parameters.

The process of calculating the active node partial graph illustrated in step S302 of FIG. 17 will be described. By obtaining the list of all the active nodes by the relay control manager 130b, the active node partial graph is obtained. Here, the information of the edge of the active node partial graph is the adjacency list of each active node. For example, the all empty nodes 20 of $\Gamma_p$ is defined as E, and the partial graph including E∪S∪I is defined as $\Gamma_1$.

The process of calculating the interconnected component list of the active node partial graph illustrated in step S303 of FIG. 17 will be described. The relay control manager 130b obtains the interconnected component of the active node partial graph based on a graph theory. For example, in the example illustrated in FIG. 1, the interconnected components of the active node partial graph are interconnected components (J+E), (I+J), (K), and (L). The relay control manager 130b registers each interconnected component in the interconnected component list.

The process of calculating the interconnected component graph illustrated in step S304 of FIG. 17 will be described. The relay control manager 130b extracts all pairs of the two elements from the interconnected component list of the active node partial graph and registers the extracted pairs in the list of interconnected component pairs of the active node partial graph. The relay control manager 130b generates an "interconnected component graph" with a list of interconnected component pairs of the active node partial graph or all as "edges".

For example, in FIG. 1, in a case where the start node is included in the interconnected component (J+E) and the end node is included in the interconnected component (I+J), the relay control manager 130b sets a "pair" of the interconnected components as the pair of the interconnected component (J+E) and the interconnected component (I+J). In addition, the relay control manager 130b sets the interconnected components (L) and (K) as "edges" of the interconnected component graph.

The edge of the interconnected component graph illustrated in step S305 of FIG. 17 and the process of calculating the passing cost will be described. The relay control manager 130b obtains the shortest route for each element of the "edge" of the "interconnected component list" that is a list of interconnected component pairs of the active node partial graph. The shortest route includes a start point and an end point.

Here, communication between the start node and the end node is bidirectional symmetric. That is, in a case where the communication direction is changed between the start node and the end node, the roles of the start node and the end node are switched to each other. However, the shortest distance is the same as before the exchange.

The relay control manager 130b calculates a "Manhattan distance" for the two interconnected components (the interconnected component including the start node and the interconnected component including the end node). For example, in a case of calculating the Manhattan distance, the relay control manager 130b may execute the nearest adjacent search. Both end nodes (starting node and end node) of the shortest route are included in different interconnected components, respectively. At this time, these end nodes are referred to as representative nodes of each interconnected component with respect to this interconnected component pair.

Figure 18:
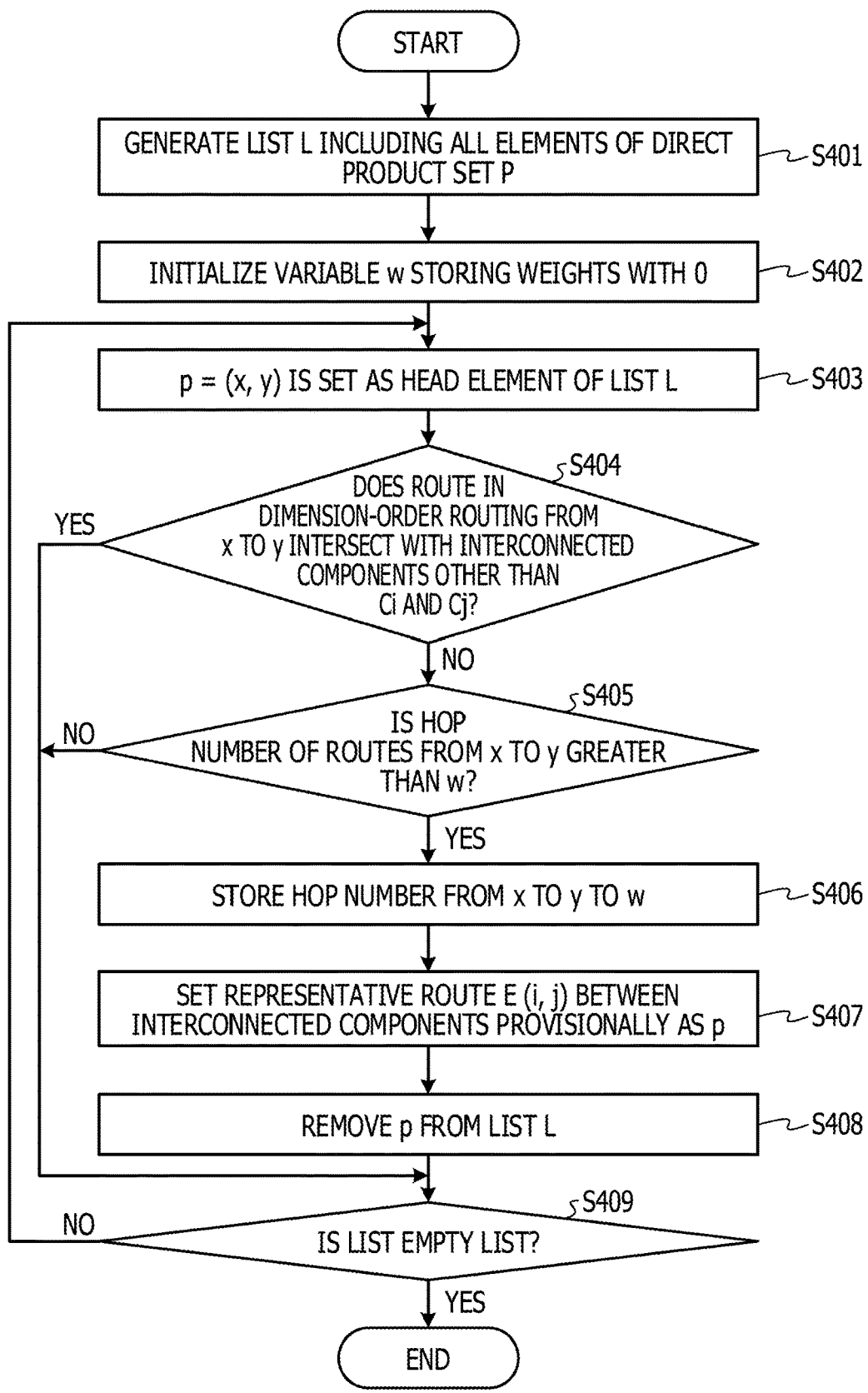
FIG. 18 is a flowchart illustrating a processing procedure for calculating an edge of the interconnected component graph and passing cost.

FIG. 18 is a flowchart illustrating a processing procedure for calculating an edge of the interconnected component graph and passing cost. As illustrated in FIG. 18, the relay control manager 130b generates a list L including all the elements of a direct product set P (step S401).

The relay control manager 130b initializes a variable w for storing weights with 0 (step S402). The relay control manager 130b sets p=(x, y) to be the first element of the list L (step S403).

In a case where the route in the dimension-order routing from x to y does not intersect with the interconnected component other than $C_i$ and $C_j$ (step S404, No), the relay control manager 130b moves to step S405. On the other hand, in a case where the route in the dimension-order routing from x to y intersects the interconnected components other than $C_i$ and $C_j$ (step S404, Yes), the relay control manager 130b proceeds to step S409.

In a case where the number of hops of the route from x to y is larger than w (step S405, Yes), the relay control manager 130b proceeds to step S406. On the other hand, in a case where the number of hops of the route from x to y is not larger than w (step S405, No), the relay control manager 130b proceeds to step S409.

The relay control manager 130b stores the number of hops from x to y in w (step S406). The relay control manager 130b provisionally sets a representative route E (i, j) between the interconnected components as p (step S407).

The relay control manager 130b removes p from the list L (step S408). In a case where the list is an empty list (step S409, Yes), the relay control manager 130b ends the process. In a case where the list is not the empty list (step S409, No), the relay control manager 130b proceeds to step S403.

Here, in a case where the value of a return value (weight w) in the process illustrated in FIG. 18 is a positive number, it is indicated there is an edge $e_{ij}$ interconnecting the vertex $v_i$ of $\Gamma_c$ to $C_i$ and the vertex $v_j$ of $\Gamma_c$ to $C_j$. In this case, the relay control manager 130b sets the weight corresponding to $e_{ij}$ to $w_{ij}$. After the relay control manager 130b executes the process illustrated in FIG. 18, the node pair (x, y), which is the content of E(i, j), becomes a pair of each representative node of each the route component $C_i$ corresponding to the route $e_{ij}$ of $\Gamma_c$ and $C_j$.

The relay control manager 130b sets the passing cost of each edge of the interconnected component graph as the communication cost (for example, the Manhattan distance) between the nodes that are the starting point or the ending point of the shortest route in the interconnected components at both ends of each edge.

A component including S as an interconnected component of $\Gamma_1$, is defined as $C_1$, and a component including I is defined as $C_2$. For example, let $S \subset C_1$ and $I \in C_2$. When $C_1 = C_2$ is established, there is a communication route from S to I that passes only vertices (nodes) and edges (links) included in interconnected component $C_1 = C_2 = C$ of $\Gamma_1$. Communication using the communication route included in C does not interfere with communication of other jobs. When $C_1 \neq C_2$, the relay control manager 130b obtains the minimum cost flow in the interconnected component graph $\Gamma_c$ and pulls back the obtained minimum cost flow to the route to the physical network $\Gamma_p$ described later.

Setting of edges in interconnected component graph $\Gamma_c$ and calculation of weight of each edge are expressed as follows: when the "nodes having adjacent nodes not included in each interconnected component" in $C_i$ and $C_j$ are $D_i=\partial C_i$ and $D_j=\partial C_j$. Let $D_i$ and $D_j$ be the direct product set $P=D_i\times D_j$. That is, when $(x, y)\in P$, let $x\in D_i$ and $x\in D_j$.

The process of calculating the minimum cost flow in the interconnected component graph illustrated in step S306 in FIG. 17 will be described. In the interconnected component graph $\Gamma_c$, the relay control manager 130b obtains a route that gives the minimum cost flow with the interconnected component including the starting point of communication in the physical network as the starting point and the interconnected component including the communication ending point in the physical network as the terminal point. Here, it is assumed that even if the communication is bilaterally symmetrical and the roles of the start point and the end point are exchanged, it is a route that gives the minimum cost flow. The start point of the center is defined as S and the end point of the communication is defined as I (TO node 25).

The relay control manager 130b uses the weight w of the edge of the interconnected component graph $\Gamma_c$ as the passing cost, $v_1$ as the start point, and $v_2$ as the end point, and obtains the route $R=(v_1, x_1, x_2, \ldots, x_m, v_2)$ in which the passing cost becomes minimum. For example, in the interconnected component graph illustrated in FIG. 1, in a case where an interconnected component including a start node is an interconnected component (J+E), an interconnected component including an end node is an interconnected component (I+J), a passing cost of the route 10(L) is larger than the passing cost of route 10(K), the route becomes the interconnected component (J+E), the route 10(K), and the interconnected component (I+J).

A process of pulling back the route in the interconnected component graph illustrated in step S306 in FIG. 17 to the physical network will be described. The relay control manager 130b associates the route having the smallest passing route with the route in the physical network in the interconnected component graph $\Gamma_c$ and specifies the suboptimal route.

Here, it is assumed that the interconnected components of the graph $\Gamma_1$ corresponding to "$x_1, x_2, \ldots, x_m$" is $X_1, \ldots, X_m$. The relay control manager 130b determines a pair of representative nodes of the interconnected component $C_1$ and the interconnected component $X_1$ as $(f_1, g_1)$, a pair of representative nodes of the interconnected component $X_1$ and the interconnected component $X_2$, sequentially, to $(f_{m-1}, g_{m-1})$ as $(f_2, g_2)$.

A pair of interconnected component m and each interconnected node of interconnected component C1 is defined as $(f_m, g_m)$. The start node of the communication is defined as the node $g_0$ in the interconnected component $C_1$. The end node of the communication is defined as the node $f_{m+2}$ in the interconnected component $C_2$. At this time, the relay control manager 130b obtains a route passing only the nodes among the interconnected components from $g_j$ to $f_{j+1}$. The relay control manager 130b returns the route $r=(g_0, f_1, g_1, \ldots, f_m, g_m, f_{m+1})$ in the physical network graph $\Gamma_p$ that interconnects the obtained route and the route from $f_i$ to $g_i$ from the interconnected component graph $\Gamma_c$ to the physical network graph $\Gamma_p$.

Figure 19:
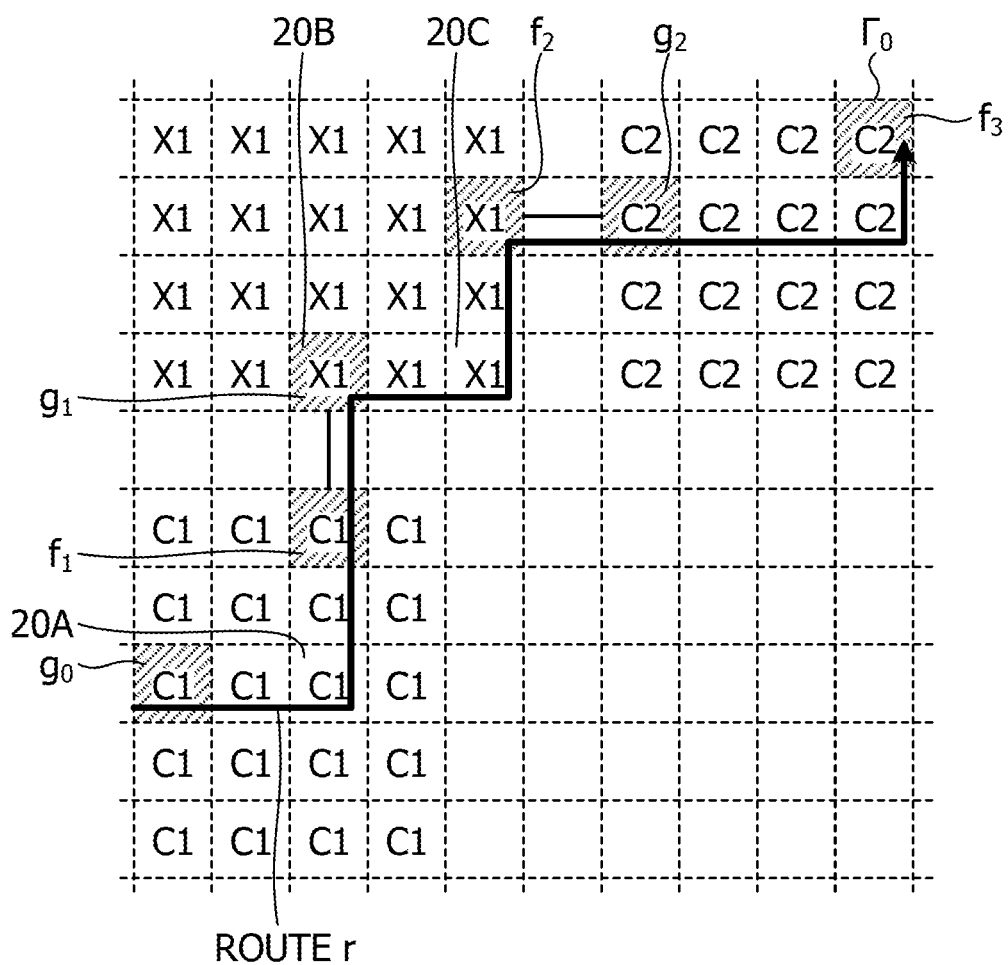
FIG. 19 is a diagram illustrating a pullback to the physical network.

FIG. 19 is a diagram for illustrating a pullback to the physical network. In FIG. 19, for simplicity, m=1.

As illustrated in FIG. 19, the interconnected component graph $\Gamma_c$ is an interconnected component graph configured of the interconnected component $C_1$, interconnected component $X_1$, and interconnected component $C_2$. The route from the start point $v_1$ to the end point $v_2$ (route before being pulled back) in the interconnected component graph $\Gamma_c$ is defined as a route R $(v_1, x_1, v_2)$. Representative points with respect to edges of interconnected component $C_1$ and interconnected component $X_1$ are defined as $f_1$ and $g_1$, respectively. Representative points with respect to the edges of interconnected component $C_1$ and interconnected component $X_2$ are $f_2$ and $g_2$, respectively.

When the relay control manager 130b pulls back the route R to the graph $\Gamma_0$ corresponding to the physical network on the interconnected component graph $\Gamma_c$ under the conditions as described above, the returned route r is the route $r=(g_0, f_1, g_1, f_2, g_2, f_3)$. For example, for each interconnected component, the node 20 serving as a representative point is preset.

The relay control manager 130b gives the route ID to the route r and adds the entry of the route configuration management table. The route within the mesh or torus network is represented as a line bending at right angles in the space of network coordinates. Therefore, the relay control manager 130b specifies each node corresponding to the end point of each line segment configuring the polygonal line of the route as a relay node. For example, in the example illustrated in FIG. 19, nodes 20A, 20B, and 20C are specified as relay nodes.

For each relay node, the relay control manager 130b specifies the "next transfer destination node" in order of passing from the start node to the end node. The relay control manager 130b notifies each relay node of a routing table entry associating the route ID, the coordinates of the end node, and the next transfer destination node.

Figure 20:
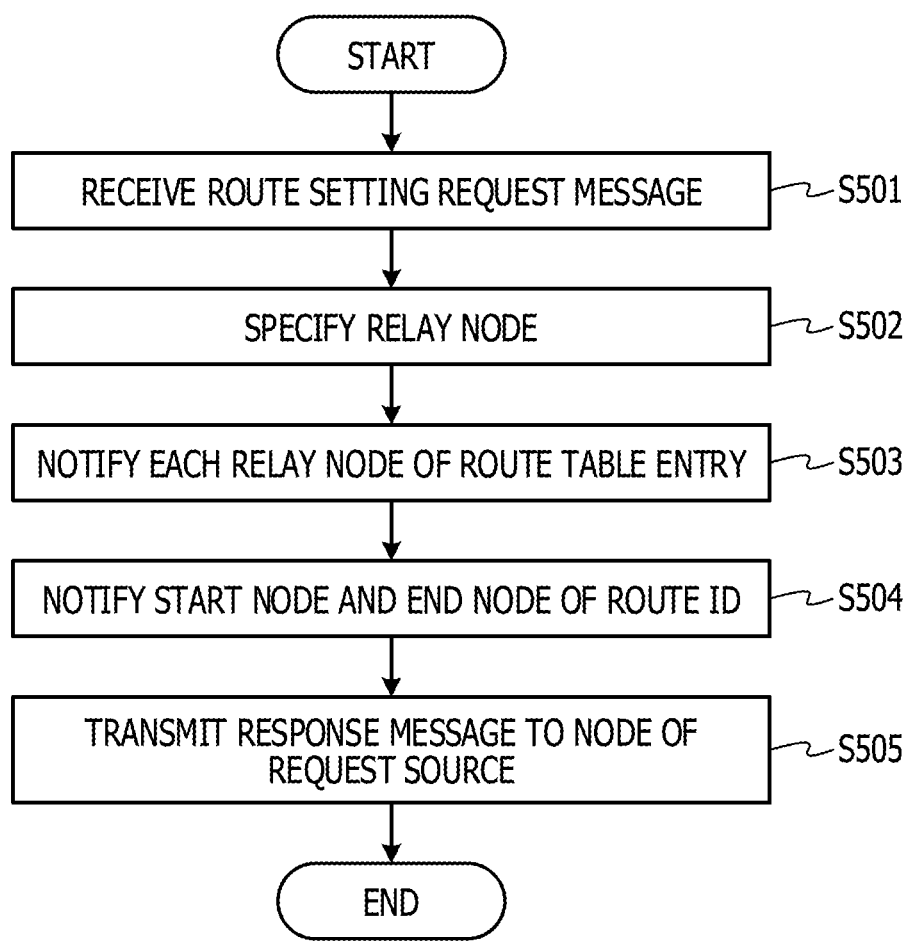
FIG. 20 is a flowchart illustrating a processing procedure of the relay control node according to the present embodiment.

Next, the processing procedure of the relay control node 100 will be described. FIG. 20 is a flowchart illustrating a processing procedure of the relay control node according to the present embodiment. As illustrated in FIG. 20, the reception unit 130a of the relay control node 100 receives the route setting request message from the requesting node 20 (step S501).

The relay control manager 130b of the relay control node 100 specifies each relay node in the route having the smallest passing cost among the routes from the start node to the end node (step S502). The process of step S502 corresponds, for example, to the process illustrated in FIG. 17.

The relay control manager 130b notifies the routing table entry of each relay node (step S503). The relay control manager 130b notifies the start node and the end node of the route ID (step S504). The transmission unit 130c of the relay control node 100 transmits a response message to the request start node (step S505).

Next, the effects of the relay control node 100 according to the present embodiment will be described. The relay control node 100 obtains a route having a low passing cost in units of interconnected components based on an interconnected component graph including interconnected components configured of active nodes and interconnected components composed of other nodes and perform pulling back of the obtained route to the actual physical network to specify each of the relay nodes. Accordingly, even if the number of nodes 20 in the physical network is large, it is possible to determine the relay node that determines the inter-node communication route without taking time while consider the passing cost.

Generally, in a large-scale parallel system, since "a job that uses a large number of nodes at the same time" that is executed only in the large-scale system is executed, the number of vertices of the "interconnected component graph" is small compared with the graph corresponding to an original physical network. For example, in a system in which an average job uses 100 nodes at the same time, the route with the low passing cost may be calculated on a graph with a number of vertices of $\frac{1}{100}$, thereby reducing the calculation cost.

When edges of an interconnected component graph are generated from all "pairs of interconnected components of partial graphs with active nodes as vertices" in the physical network, the number of edges is the order of the square of the number of interconnected components. Therefore, the relay control manager 130b may reduce the number of edges with only a part of the interconnected component pair as the edge of the interconnected component graph.

By decreasing the number of edges of the interconnected component graph as described above, there are advantages such that the calculation time of the edge passing cost is reduced, and the calculation time of the route in the interconnected component graph is reduced.

However, it is desirable not to exclude edges that may give the shortest route. For example, for three interconnected components $C_1$, $C_2$, and $C_3$, the interconnected component $C_2$ is an interconnected component located at an intermediate position between the interconnected components $C_1$ and $C_3$. In this case, the relay control manager 130b excludes the edges directly interconnecting the interconnected components $C_1$ and $C_3$, leaving the edges between the interconnected components $C_1$ and $C_2$ and the interconnected components $C_1$ and $C_3$.

The relay control manager 130b may determine how the interconnected component $C_2$ is an interconnected component at an intermediate position between the interconnected components $C_1$ and $C_3$ with respect to the three interconnected components $C_1$, $C_2$ and $C_3$. For example, the relay control manager 130b generates a bounding box indicating the sub-mesh including the interconnected component from the minimum value and the maximum value of the coordinates of all nodes of each dimension included in a certain interconnected component.

In an m-dimensional mesh or torus network, each bounding box has a fixed vertex of 2m vertices irrespective of the number of nodes included in the interconnected component. The bounding boxes of the three interconnected components $C_1$, $C_2$, and $C_3$ are bounding boxes $B_1$, $B_2$, $B_3$. It is assumed that the network address of the vertex of the bounding box is the coordinates of the m-dimensional Euclidean space. The relay control manager 130b determines whether or not a straight line interconnecting one of the vertices of B1 and one of the vertices of B3 passes through the interior of B2 by calculation of a combination of fixed number of vertices.

Figure 21:
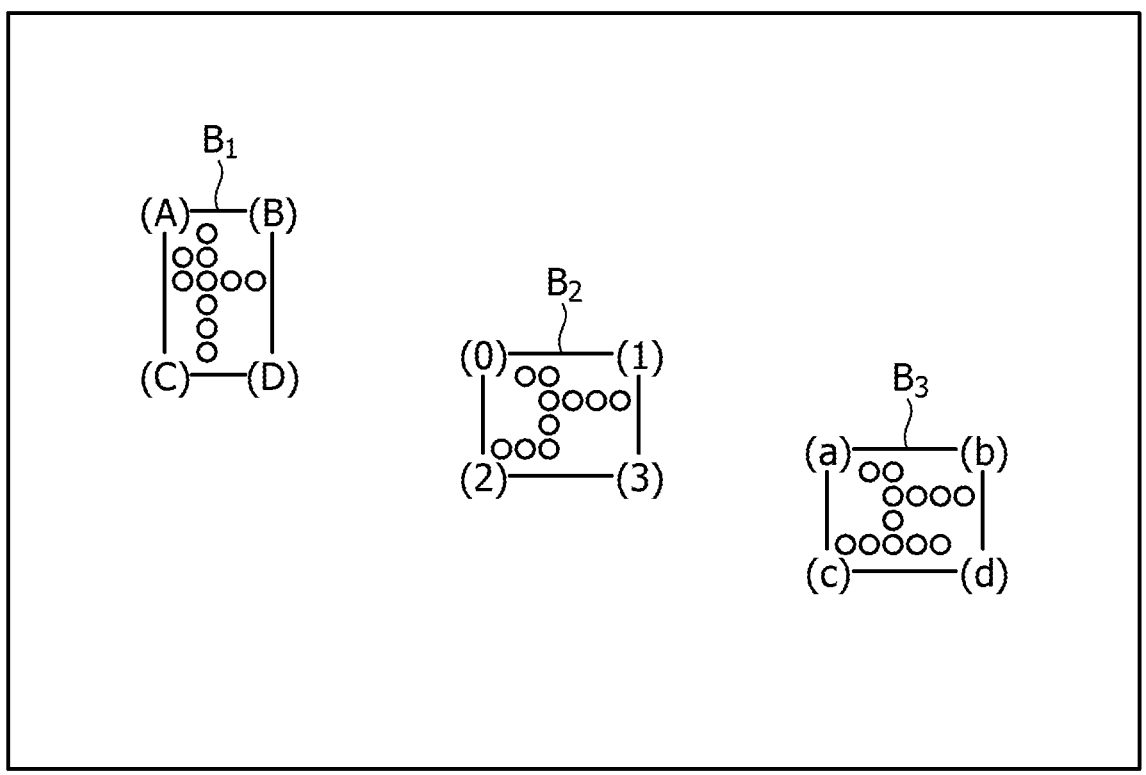
FIG. 21 is a diagram illustrating a reduction in the number of edges of the interconnected component graph by a bounding box.

FIG. 21 is a diagram for illustrating a reduction in the number of edges of the interconnected component graph by a bounding box. For example, as illustrated in FIG. 21, the bounding box B1 includes vertices (A), (B), (C) and (D). The bounding box B2 includes vertices (0), (1), (2), and (3). The bounding box B3 includes vertices (a), (b), (c), and (d). For example, in a case where the straight line interconnecting the vertex (A) and the vertex (a) has the intersection point with the edge interconnecting the two adjacent points of the vertices (0), (1), (2), and (3), the relay control manager 130b determines whether the interconnected component $C_2$ is an interconnected component located at an intermediate position between the interconnected components $C_1$ and $C_3$.

Figure 22:
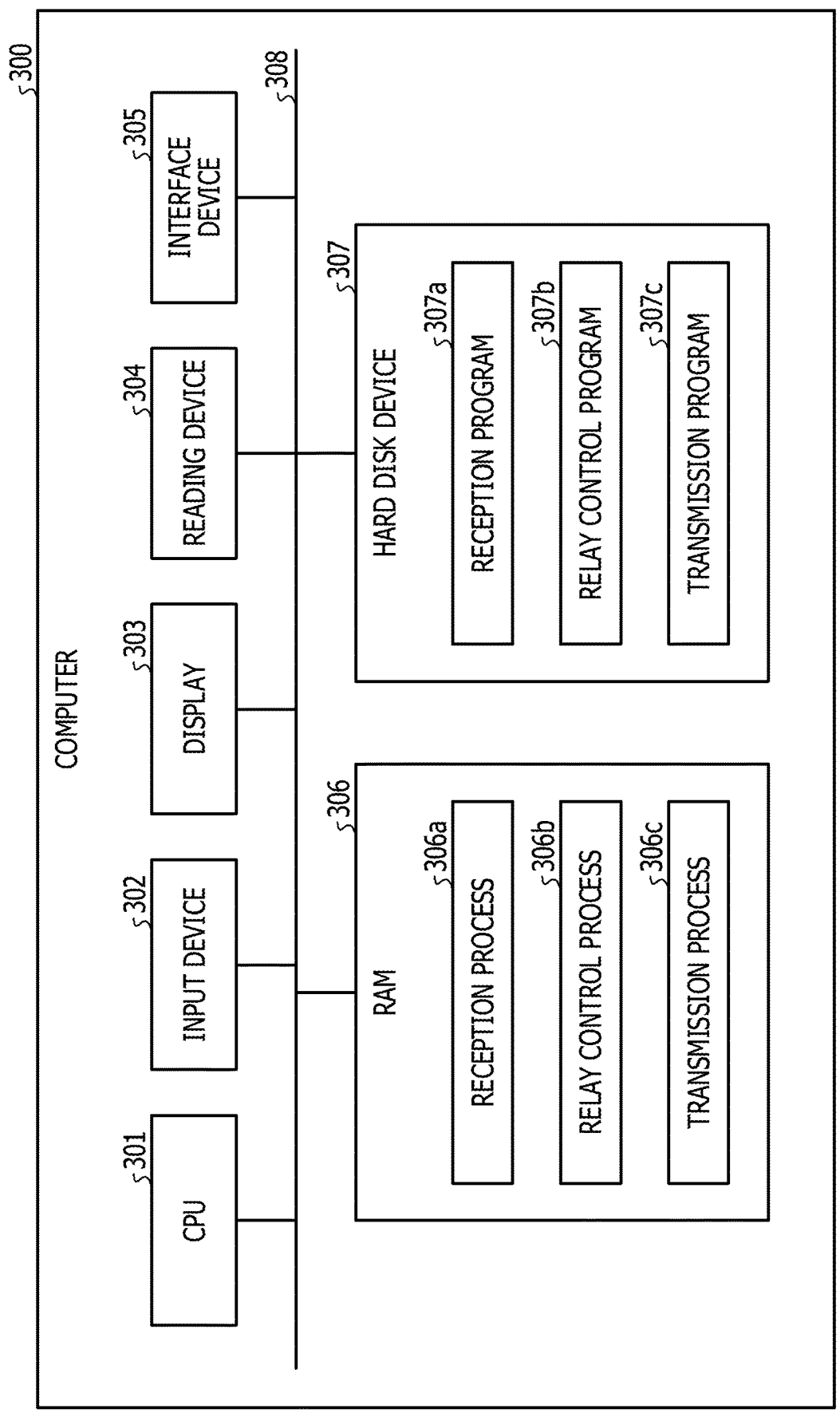
FIG. 22 is a diagram illustrating an example of a hardware configuration of a computer that realizes the same functions as the relay control node.
Figure 23:
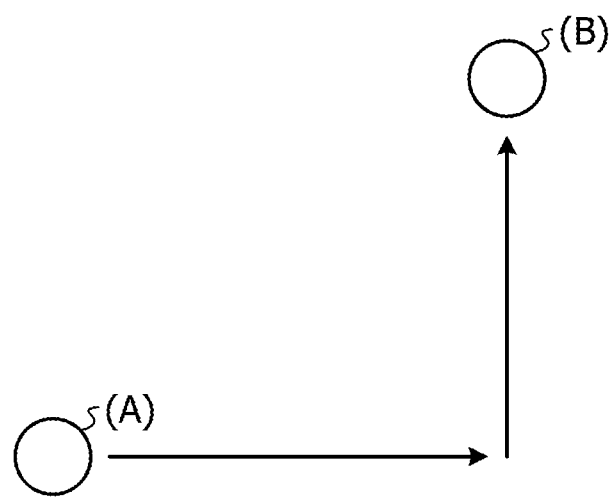
FIG. 23 is a diagram illustrating an example of dimension-order routing in two dimensions.
Figure 24:
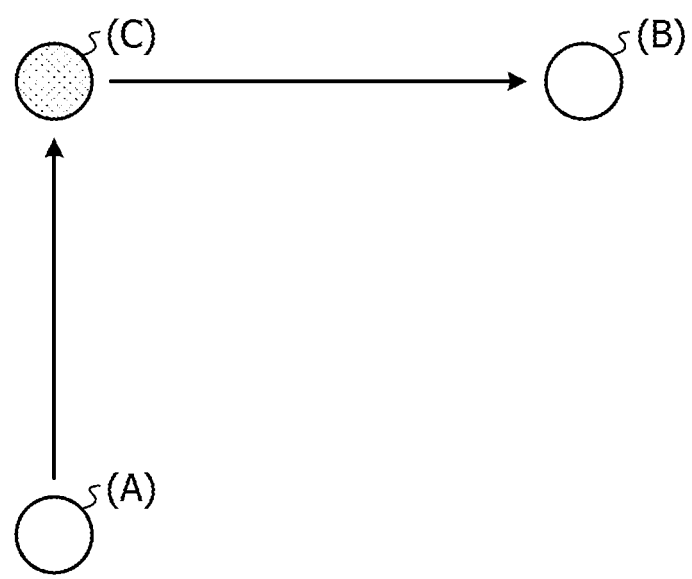
FIG. 24 is a diagram illustrating an example of a detour route by relay node setting.

Next, an example of a hardware configuration of a computer that realizes the same functions as the relay control node 100 illustrated in the above embodiment will be described. FIG. 22 is a diagram illustrating an example of a hardware configuration of a computer that realizes the same functions as the relay control node.

As illustrated in FIG. 22, a computer 300 includes a CPU 301 that executes various arithmetic processes, an input device 302 that receives input of data from a user, and a display 303. In addition, the computer 300 includes a reading device 304 that reads a program or the like from a storage medium, and an interface device 305 that exchanges data with an external device. In addition, the computer 300 includes a RAM 306 that temporarily stores various kind of information, and a hard disk device 307. Each of the devices 301 to 307 is coupled to the bus 308.

The hard disk device 307 includes a reception program 307a, a relay control program 307b, and a transmission program 307c. The CPU 301 reads out the reception program 307a, the relay control program 307b, and the transmission program 307c and develops the programs in the RAM 306.

The reception program 307a functions as a reception process 306a. The relay control program 307b functions as a relay control process 306b. The transmission program 307c functions as a transmission process 306c.

The process of the reception process 306a corresponds to the processing of the reception unit 130a. The process of the relay control process 306b corresponds to the process of the relay control manager 130b. The process of the transmission process 306c corresponds to the process of the transmission unit 130c.

The programs 307a to 307c may not be stored in the hard disk device 307 from the beginning. For example, each program is stored in "portable physical medium" such as a flexible disk (FD), a CD-ROM, a DVD disk, a magneto-optic disk, an IC card, or the like inserted into the computer 300. Then, the computer 300 may read and execute the programs 307a to 307c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
receive, from a first node included in a parallel calculation system including a plurality of nodes, a request for communication between the first node and a second node included in the parallel calculation system;
acquire job execution information relating a job to be executed by the parallel calculation system;
generate connected graph information based on first information on the first node, second information on the second node, the job execution information, and topology information indicating a topology of the plurality of nodes;
generate, based on the connected graph information, route information indicating a plurality of routes used when the communication between the first node and the second node is executed;

specify, based on the route information, a route having the lowest passing cost among the plurality of routes; and specify a node included in the specified route as a relay node based on positions of the plurality of nodes in the specified route.

2. The information processing apparatus according to claim 1, wherein the processor is configured to:

specify a plurality of active nodes from the first node, the second node, and a plurality of third nodes included in the plurality of nodes, generate a plurality of partial graphs including a first partial graph having the plurality of active nodes as vertices interconnected and a second partial graph having a plurality of fourth nodes other than the plurality of active nodes as vertices interconnected, and generate, based on the topology information, the connected graph information by mutually coupling the plurality of partial graphs.

3. The information processing apparatus according to claim 2, wherein the processor is configured to generate, based on the connected graph information, the route information indicating a plurality of routes leading to a partial graph including the second node among the plurality of partial graphs from a partial graph including the first node among the plurality of partial graphs via another partial graph of the plurality of partial graphs.

4. A method comprising:

receiving, from a first node included in a parallel calculation system including a plurality of nodes, a request for communication between the first node and a second node included in the parallel calculation system;

acquiring job execution information relating a job to be executed by the parallel calculation system;

generating connected graph information based on first information on the first node, second information on the second node, the job execution information, and topology information indicating a topology of the plurality of nodes;

generating, based on the connected graph information, route information indicating a plurality of routes used when the communication between the first node and the second node is executed;

specifying, based on the route information, a route having the lowest passing cost among the plurality of routes; and specifying a node included in the specified route as a relay node based on positions of the plurality of nodes in the specified route.

5. The method according to claim 4, further comprising:

specifying a plurality of active nodes from the first node, the second node, and a plurality of third nodes included in the plurality of nodes;

generating a plurality of partial graphs including a first partial graph having the plurality of active nodes as vertices interconnected and a second partial graph having a plurality of fourth nodes other than the plurality of active nodes as vertices interconnected; and generating, based on the topology information, the connected graph information by mutually coupling the plurality of partial graphs.

6. The method according to claim 5, further comprising:

generating, based on the connected graph information, the route information indicating a plurality of routes leading to a partial graph including the second node among the plurality of partial graphs from a partial graph including the first node among the plurality of partial graphs via another partial graph of the plurality of partial graphs.

7. A non-transitory computer-readable storage medium storing a program that causes an information processing apparatus to execute a process, the process comprising:

receiving, from a first node included in a parallel calculation system including a plurality of nodes, a request for communication between the first node and a second node included in the parallel calculation system;

acquiring job execution information relating a job to be executed by the parallel calculation system;

generating connected graph information based on first information on the first node, second information on the second node, the job execution information, and topology information indicating a topology of the plurality of nodes;

generating, based on the connected graph information, route information indicating a plurality of routes used when the communication between the first node and the second node is executed;

specifying, based on the route information, a route having the lowest passing cost among the plurality of routes; and specifying a node included in the specified route as a relay node based on positions of the plurality of nodes in the specified route.

8. The non-transitory computer-readable storage medium according to claim 7, the process further comprising:

specifying a plurality of active nodes from the first node, the second node, and a plurality of third nodes included in the plurality of nodes;

generating a plurality of partial graphs including a first partial graph having the plurality of active nodes as vertices interconnected and a second partial graph having a plurality of fourth nodes other than the plurality of active nodes as vertices interconnected; and generating, based on the topology information, the connected graph information by mutually coupling the plurality of partial graphs.

9. The non-transitory computer-readable storage medium according to claim 8, the process further comprising:

generating, based on the connected graph information, the route information indicating a plurality of routes leading to a partial graph including the second node among the plurality of partial graphs from a partial graph including the first node among the plurality of partial graphs via another partial graph of the plurality of partial graphs.

* * * * *